(12) United States Patent
Shuster et al.

(10) Patent No.: US 9,338,590 B2
(45) Date of Patent: May 10, 2016

(54) GLOBAL CONTACT SYNCHRONIZATION

(71) Applicant: Buzd, LLC, Fresno, CA (US)

(72) Inventors: Gary Stephen Shuster, Fresno, CA (US); David Goldsmith, Manlius, NY (US)

(73) Assignee: BUZD, LLC, Fresno, CA (US)

( * ) Notice: Subject to any disclaimer, the term of this patent is extended or adjusted under 35 U.S.C. 154(b) by 0 days.

(21) Appl. No.: 14/448,988

(22) Filed: Jul. 31, 2014

(65) Prior Publication Data
US 2015/0156606 A1 Jun. 4, 2015

Related U.S. Application Data

(63) Continuation of application No. 14/142,535, filed on Dec. 27, 2013, now Pat. No. 8,798,596.

(60) Provisional application No. 61/747,348, filed on Dec. 30, 2012, provisional application No. 61/790,249, filed on Mar. 15, 2013, provisional application No. 61/864,647, filed on Aug. 12, 2013.

(51) Int. Cl.
| | |
|---|---|
| *H04M 3/42* | (2006.01) |
| *H04L 29/06* | (2006.01) |
| *H04W 24/00* | (2009.01) |
| *H04W 4/02* | (2009.01) |
| *G06Q 10/10* | (2012.01) |
| *H04W 4/20* | (2009.01) |
| *H04W 4/08* | (2009.01) |
| *H04W 64/00* | (2009.01) |

(52) U.S. Cl.
CPC .............. *H04W 4/02* (2013.01); *G06Q 10/1093* (2013.01); *H04W 4/023* (2013.01); *H04W 4/08* (2013.01); *H04W 4/206* (2013.01); *H04W 64/00* (2013.01)

(58) Field of Classification Search
CPC ............................ G06Q 10/109; G06Q 50/01
USPC ................... 455/456.1–456.4, 414.1–414.3; 379/201.01, 218.01
See application file for complete search history.

(56) References Cited

U.S. PATENT DOCUMENTS

| | | | |
|---|---|---|---|
| 2007/0202853 A1* | 8/2007 | Soh ..................... | H04M 1/2745 455/414.1 |
| 2007/0226034 A1 | 9/2007 | Khan | |
| 2008/0153474 A1 | 6/2008 | Scott | |
| 2009/0016509 A1* | 1/2009 | Shah ................... | H04M 3/4872 379/142.11 |
| 2010/0057562 A1 | 3/2010 | Gabbay | |
| 2010/0254525 A1* | 10/2010 | Maly ....................... | H04M 1/67 379/207.03 |
| 2010/0260327 A1* | 10/2010 | Ray ........................... | 379/93.23 |
| 2011/0022529 A1* | 1/2011 | Barsoba ............ | G06F 17/30047 705/319 |

(Continued)

FOREIGN PATENT DOCUMENTS

EP      1071055      12/2004

OTHER PUBLICATIONS

International Search Report and Written Opinion issued in PCT/US2013/078122, dated May 13, 2014.

*Primary Examiner* — Dung Hong
(74) *Attorney, Agent, or Firm* — Coleman & Horowitt, LLP; Sherrie Flynn

(57) ABSTRACT

A situational and global context aware calendar, communications, and/or relationship management method and system is disclosed. The system is configured to receive non-calendaring related context information, and, based on that context information, to automatically determine one or more parameters of a meeting request.

20 Claims, 17 Drawing Sheets

(56) References Cited

U.S. PATENT DOCUMENTS

| | | | |
|---|---|---|---|
| 2011/0081920 A1 | 4/2011 | Hung et al. | |
| 2012/0128251 A1* | 5/2012 | Petrou | G06F 17/30253 382/182 |
| 2012/0210240 A1* | 8/2012 | Neystadt | G06Q 30/0282 715/739 |
| 2012/0252533 A1 | 10/2012 | Lai | |
| 2012/0276879 A1* | 11/2012 | Schwartz | H04M 3/02 455/414.1 |
| 2013/0034221 A1* | 2/2013 | Aaron | H04M 1/72519 379/157 |
| 2013/0109361 A1* | 5/2013 | Felt | H04W 4/02 455/414.1 |
| 2013/0114849 A1* | 5/2013 | Pengelly | G06F 17/289 382/103 |
| 2014/0074986 A1* | 3/2014 | Stoop | H04L 67/02 709/219 |
| 2014/0156746 A1* | 6/2014 | Wheatley | H04L 67/22 709/204 |

* cited by examiner

Meeting Request

| File | Smart Meeting | Insert | Options | Format Text | Review |

Send

Invites: Herbert Goldman; [Suggest—416]

Subject: Kosher Foods Sales Pitch

Location: Kern's Deli [Suggest—418]

420 ⤹

Suggested Locations:
- Kern's Deli 89%
- Bagel Me 78%

Start Time: Tue 9/10/2013  30  ☐ All day

End Time: Tue 9/10/2013  3:30

Suggest Table — 424

Make Reservation: Kern's Deli - 3pm — 426

Meet to go over new Kosher foods available to be distributed by Goldman's Groceries. — 450

Suggested Times
- Sept. 6 (Friday) — None
- Sept. 7 (Saturday) — Any Time After Sunset (7:10pm+)
- Sept. 9 - 12 (M-Th) — 1pm - 5pm
- Sept. 13 - 14 (F-Sat) — Yom Kippur - None

FIG. 4

Pre-Departure
    Direct, Travel Agents and Online Services
        Fees
        Secrets
        Seat selection
    Hotel ratings, costs and additional fees
    Computer usage and Internet access
    Currency and conversion
        Use of credit cards
        International fees
        Hidden currency
        Notifying CC company
    Teach your team about currency with tips
    Baggage weight limits
        Fees for baggage
        Carry on limits
        US fluid policy
    Passport requirements
        Visas and time to secure
        Entrance into and leaving a country
    Advise them on questions to ask
    Establish framework for male / female
        Behaviors
        Cultural differences
        Proper and improper actions
    Enlighten about food
        On planes
        In restaurants
        Areas of concern
    Medical
        Insurance you can purchase
        Shots
        Diseases
        Travel advisory
        Medicines
    Learn to mimic behavior until you understand
    Inform about heritage
    Individual economics
        Poverty, class system, wealth
    Police and military
    Local customs
    Packing requirements for women / men
    Discount and travel cards
        Eurorail
        AAA
        Amex, Visa, Mastercard, Discover

FIG. 11A

In Transit
   Airports and travel
      Frequent flier sign up
        Lounges (Business and First Class)
           Showers
           What's free / what's not
           Credit Card Access (Amex, Specialty Cards)
      Coach offerings
           Leg room in exit row
           In flight entertainment options
      Secrets to booking shorter flights
      Security check points
      Traffic time tables
      Taxi / Bus usage
           Hailing a cab
           Paying for cab
           Official vs Unofficial
      Light rail / Rail / Boat (Venice)
      Power
   Passport
     Frequent Visitor benefits
     Visas (personal and business)
     What to carry
     Copying your passport in bags
     Recommended free time activities
   What's expected in down time
     Drinking and eating expectations
   Major holidays and issues
   Terrorism
   Car rentals
   Hotel recommendations
     Safety recommendations
        Pricing and fees
   Credit Card holds and final payment
   Be conscious of time differences with those you are meeting. They may be tired for different reasons.
   Behavioral differences
     Eye contact
     Asking question
   Drinking water
     Bottled or tap
     Used to prepare food in restaurants, planes, ships
   Ear Plugs / Systems
     Upgrade lists

FIG. 11B

On the Ground
    Emergency numbers
    Services for travel arrangements
    How best to travel in groups or individual
    Political tendencies
    Baggage weight limits
        Fees for baggage
        Carry on limits
        US fluid policy
    VAT and tipping expectations for taxis, restaurants, hotels
    Language information
        different definitions in different cultures
        Languages spoken (Primary language)
        Securing Translators
        English spoken or not
    Telephone and Data
        GSM, CDMA, Quadband
        Roaming fees
        Data fees
        Access to data plans
        Email, texting, video conferencing
    Hotel ratings, costs and additional fees
    Finding long term accommodations
    Currency conversion at banks or in transit
    Customs
    Airline layout tools
        Seat Guru
    Electrical plugs and converters (multiuse)
    Access to over the counter drugs
    Pick up a local paper
    Travel insurance
    Weather, Seasons, and Environment (+ / -)
        Humidity, Rain, Heat, Sun, Snow / Ice
    Drinking water
        Bottled or tap
        Used to prepare food in restaurants, planes, ships
    People they may meet
        Street
        Airport
        Cities / towns
    Local transportation fees
        Cab and cab colors (CC accepted?)
    Nightlife and Entertainment
        Safe areas, scams

FIG. 11C

HAN International

Company > HAN International

[New Record] | 🖶

CRM Software

Next Activity:          Last Activity: 10/13/2013 10:41 pm          Last Note:          [Add To ▼]  [Message]

Company: HAN International          Phone1:          Ext:
Contact: Harry Pike          Phone2:          Ext: Cell          Registered time 10:44 AM ⎯ 1520
  Dept:          Last: Pike          Phone3:          Ext:          Current Time 9:44 PM ⎯ 1510
  Title: Chairman and CEO          Dear: Mr.          Fax:          Ext:
Source: Referral          Asst:          Email
                                          Web Site
Address:
                                          Sales Rep:
                                          Business:
  City: North Point          Zip:          Customer Type:
  State:          I Merge:          Email Broadcast:
  Country: Hong Kong                       Corporation:

Facebook:
LinkedIn:
Twitter:

[▼] [Relatio...] [Notes] [Members] [History] [Referrals] [Details] [Links] [Pending] [Opport...] [Projects] [Cases] [Summary] [Convert]

FIG. 15

GLOBAL CONTACT SYNCHRONIZATION

CROSS-REFERENCE TO RELATED APPLICATIONS

This application is a continuation of U.S. patent application Ser. No. 14/142,535, filed on Dec. 27, 2013, which claims priority from provisional U.S. Pat. App. No. 61/747,348, filed on Dec. 30, 2012, provisional U.S. Pat. App. No. 61/790,249, filed on Mar. 15, 2013, and provisional U.S. Pat. App. No. 61/864,647, filed on Aug. 12, 2013. All of these provisional applications are hereby incorporated by reference in their entirety.

TECHNICAL FIELD

The present disclosure relates to calendar management, and particularly to context aware calendar and relationship management.

BACKGROUND

Customer relationship management software ("CRM") systems are frequently used to manage calendars, meetings, and even relationships. CRM is frequently described as a strategy for managing a company's interactions with customers, clients and sales prospects. CRM is frequently used to synchronize sales activities. While CRM is intended to accomplish such goals, the currently available technology fails to meet substantial scheduling, communications, and relationship management needs of individuals and businesses.

SUMMARY

The systems, methods, and devices described herein each have several aspects, no single one of which is solely responsible for its desirable attributes. Without limiting the scope of this disclosure, several non-limiting features will now be discussed briefly.

The systems, methods, and devices of the present disclosure provide many applications and solve significant problems with existing technology, such as to create, in essence, "the device you didn't know you needed, but now that you know about it, you never want to leave home without it." In one aspect, a mobile device may deliver to the user the time it is where the prospective call recipient is located. A user interface may make it as simple as looking down and next to each contact (individual or organization) there will be a corresponding time so that the dialer may know what time it is where they are calling. The function will account for daylight savings, countries with only one time zone, states that don't changes like the rest of the world, etc. No longer will you need to do a Google search to find, "What time is it now in London?" or do the math in your head. In an additional aspect, a device may be functionally interfaced with systems such as CRM software by companies such as Salesforce, Oracle, Microsoft, etc. Users no longer have to look up the time zones in which people work to make a call, the system will display the information right next to the contact name. You'd know that right now it's 3:34 PM in Los Angeles and 6:34 AM in Hong Kong so users can make their best choices. Both services are driven by user preferences as the generic system will use the location in which the user defines as home, the second will be based upon the GPS system telling friends/coworkers where they really are if they move outside of their registered time zone.

In one example of an implementation of certain aspects of the technology described herein, one might imagine the following scenario: Mary is about to make a phone call to a friend she knows lives in Chicago which is 2 time zones behind Los Angeles. She does the math in her head and subtracts one hour from her time of 3:20 PM so she's sure her friend is at work. Immediately she's confused because her friend sounds like she's sleeping. She asks, "Are you sick?" "No," her friend replies, "We've had troubles in our London office and a team of us have flown over to work on the project." If Mary had known or been warned that her friend is in a different time zone where it's night time, Mary would not have made the call. Implementation of the technology described herein will reduce challenges with connecting due to time zone differences. Daylight savings time will no longer be an issue. Every call will be much more productive and you'll never have to look up the time in another location. If you work around the world, no longer will you have to figure out if it's +3 hours or −8 hours. Your devices will keep you up to date giving you the tools you need to connect with those you wish when it works the best for everyone involved.

In one embodiment, a computing system comprises one or more processors and a memory storing instructions that, in response to execution by the one or more processors, causes the computing system to receive a request for location information for each of a plurality of contacts, determine location information of mobile devices of the respective contacts, determine a local time for each of the determined mobile device locations, and provide the determined local times for corresponding mobile devices to a user computing device, the user computing device configured to display the determined local times in association with respective users. In one embodiment, determining location information comprises, for each of the plurality of contacts transmitting a request for geolocation information to one or more mobile devices of the contact, or accessing one or more social media data sources associated with contact.

In one embodiment, a computing system comprises one or more processors and a memory storing instructions that, in response to execution by the one or more processors, causes the computing system to receive a request for contact information for each of a plurality of contacts stored in a contact data structure on the computing device, transmit a request for location and/or time zone information for each of the plurality of contacts to a time synchronization server, receive the requested location and/or time zone information for each of the plurality of contacts from the time synchronization server, and generate a user interface for display on the computing device including a current time at the location of the computing device and a list of the plurality of contacts, each having an associated time displayed based on the respective received location and/or time zone information for the contact. In one embodiment, the instructions are further configured to cause the computing system to determine one or more events associate with respective locations of contacts, and provide indications of the determined one or more events in the user interface in association with respective corresponding contacts. The instructions may be further configured to cause the computing system to, for each contact, determine an acceptable call time period and an unacceptable call time period, and in response to the user requesting to call a particular contact wherein the current time of the contact is within the unacceptable call time period for the, provide a visual and/or audible alert. The instructions may further be configured to cause the computing system to restrict the call to the particular contact. The acceptable call time period for respective contacts may be determined based on preferences of the contacts. The acceptable call time period for respective contacts may be determined based on respective locations of contacts. The plurality of contacts in the user interface may be associated with respective indicators regarding whether contacts are within corresponding acceptable call time periods. In one embodiment, a text color, shading, font size, and/or other visual indicator of contacts within an acceptable call time period is different from the text color, shading, font size, and/or other visual indicators of contacts within an unacceptable call time period. In one embodiment, the received location and/or time zone information comprises, for respective contacts, one or more of a first indicator of a current time zone and/or time associated with a geolocation of one or more devices of the contact, a second indicator of a current time zone and/or time associated with a registered device location associated with one or more devices of the contact, and/or a third indicator of a current time zone and/or time associated with a geolocation of the contact based on data obtained from one or more social media data sources. The received location and/or time zone information may comprise, for respective contacts, an expected current time at a location of the contact based on a combination of two or more of the first indicator, second indicator, and third indicator. The user interface may further include a first visual characteristic associated with a first subset of contacts wherein first indicators are provided and a second visual characteristic associated with a second subset of contacts wherein second indicators are provided. In one embodiment, the instructions are further configured to cause the computing system to receive, for each contact, indicators of whether the contact is within an acceptable call time period or an unacceptable call time period, wherein the user interface further comprises a first visual characteristic for each of a first set of the plurality of contacts within an acceptable call time period and a second visual characteristic for each of a second set of the plurality of contacts within an unacceptable call time period. In one embodiment, the computing system comprises a mobile device and the user interface comprises at least a part of a contact information application or is displayed as part of a contact resource management software application. In one embodiment, the instructions are further configured to cause the computing system to receive, for respective contacts, local information including indicators of one or more current events, weather, or social customers, at the received location of the contact. The local information may be included in the user interface in a pop-up that is activated in response to the user selecting a particular contact.

In another embodiment, the systems, methods, and devices of the present disclosure provide a situational and global context aware calendar, communications, and/or relationship management system ("the system") configured to provide context aware enhanced calendaring, messaging, notification, and/or relationship management. In various embodiments, interactive visualizations and analyses provided by the system may be based on gathered social media, medical, immunization, insurance, financial, geographic, religious, cultural, weather, public record, traffic, venue, airline and/or other forms and types of data, whether text, graphic, multimedia or in other formats. This data, combined with environmental, contextual, and/or user input sensing allows for modifications to calendaring and messaging interactions that are more effective and efficient.

In one embodiment, a situational and global context aware calendar, communications, and/or relationship management method and system is disclosed. In one embodiment, the system is configured to receive from at least one environmental data gathering device (such as a camera or microphone), data about at least one target participant at a gathering of a plurality of participants, analyze such data to determine at least one observed behavior (e.g. a potential observed behavior or cue) of said target participant, compare said at least one observed behavior against a dataset of at least one behavior; determine when said at least one behavior exceeds a threshold similarity to a behavior in said dataset; and communicate, to at least one notification device, said at least one observed behavior.

In one embodiment, a computing device comprises one or more processors, a memory, and a network interface. The memory may comprise instructions that, when executed by the processor, cause the device to query, via the network interface, a first database, the first database comprising non-calendaring-application context information. In response to the query, the device may receive, via the network interface, a first response comprising a first information, the first information comprising non-calendaring-application context information related to at least one or more persons. The device may receive, via the network interface, a second query regarding a meeting request from a user device, the meeting request comprising one or more invitees. The device may compare the second query to at least one attribute of a first invitee of the one or more invitees, and in response to the comparison, transmit, via the network interface, at least one parameter of the meeting request to the user device, the one parameter being calculated, at least in part, on the first information and the at least one attribute of the first invitee.

In an embodiment, the non-calendaring-application context information comprises religious, cultural, or demographic information, and the at least one attribute of the first invitee comprises a religious, cultural, or demographic attribute.

In an embodiment, the first information comprises timing information associated with the religious, cultural, or demographic information, and, wherein the parameter comprises at least one recommended scheduled meeting time based, at least in part, on the first information.

In an embodiment, the first information comprises dining information associated with religious, cultural, or demographic information, and, wherein the at least one parameter comprises at least one recommended dining location.

In an embodiment, the first information comprises location information, and the at least one attribute of the first invitee comprises preference information.

In an embodiment, the first information comprises weather information associated with the location information, and, wherein the at least one parameter comprises at least one recommended location based, at least in part, on the first information.

In an embodiment, the first information comprises travel information associated with the location information, and, wherein the at least one parameter comprises at least one recommended scheduled location based, at least in part, on the first information.

In an embodiment, the first information comprises a stored behavior, the at least one attribute of the first invitee comprises a potential observed behavior (e.g. a cue), and the at least one parameter comprises an observed behavior related to the potential observed behavior.

In an embodiment, the stored behavior comprises a travel related behavior, the potential observed behavior comprises a scheduled flight, and the observed behavior comprises a location. In an embodiment, the stored behavior comprises a geographic related behavior, the potential observed behavior comprises a geolocation of the first invitee, and the observed behavior comprises a location.

In an embodiment, the first information comprises dining location data comprising attribute values for a plurality of locations, and the at least one attribute of the first invitee comprises dining preferences of the first invitee, the at least one parameter comprising a recommended dining location.

In an embodiment, the first information comprises meeting preferences calculated based on a correlation of a population's preferences to the population's location.

In an embodiment, the non-calendaring-application context information does not comprise a calendar schedule of the first invitee.

In an embodiment, a computerized method may be executed, comprising accessing preference information, the preference information comprising non-schedule related preferences for a first participant, receiving, via a network interface, a query from a user device comprising a meeting request, the meeting request comprising one or more requested meeting parameters, determining the one or more requested meeting parameters based at least in part on the preference information, and transmitting, via the network interface, the determined one or more requested parameters.

In an embodiment, the method may further comprise automatically generating the preference information based on the first participant's financial information.

In an embodiment, the method may further comprise automatically generating the preference information based on the first participant's medical or immunization history.

In an embodiment, the method may further comprise automatically generating the preference information based on the first participant's travel schedule.

In an embodiment, the method may further comprise automatically generating the preference information based on the user device's environmental sensors.

In an embodiment, the method may further comprise automatically generating the preference information based on the first participant's geolocation.

In an embodiment, the method may further comprise automatically generating the preference information on the first participant's religion.

In an embodiment, the method may further comprise automatically generating the preference information based on the first participant's demographics.

In an embodiment, the non-schedule related preferences comprise dining location preferences.

BRIEF DESCRIPTION OF THE DRAWINGS

The following aspects of the disclosure will become more readily appreciated as the same become better understood by reference to the following detailed description, when taken in conjunction with the accompanying drawings.

FIG. 4 shows a sample user interface of the system in which a smart calendaring meeting may be initiated, according to one embodiment.

FIG. 11A illustrates sample tips and tip categories, according to an embodiment of the present disclosure.

FIG. 11B illustrates sample tips and tip categories, according to an embodiment of the present disclosure.

FIG. 11C illustrates sample tips and tip categories, according to an embodiment of the present disclosure.

FIG. 15 illustrates an example of the global synchronization system implementation in a CRM system.

DETAILED DESCRIPTION

Figure 1:
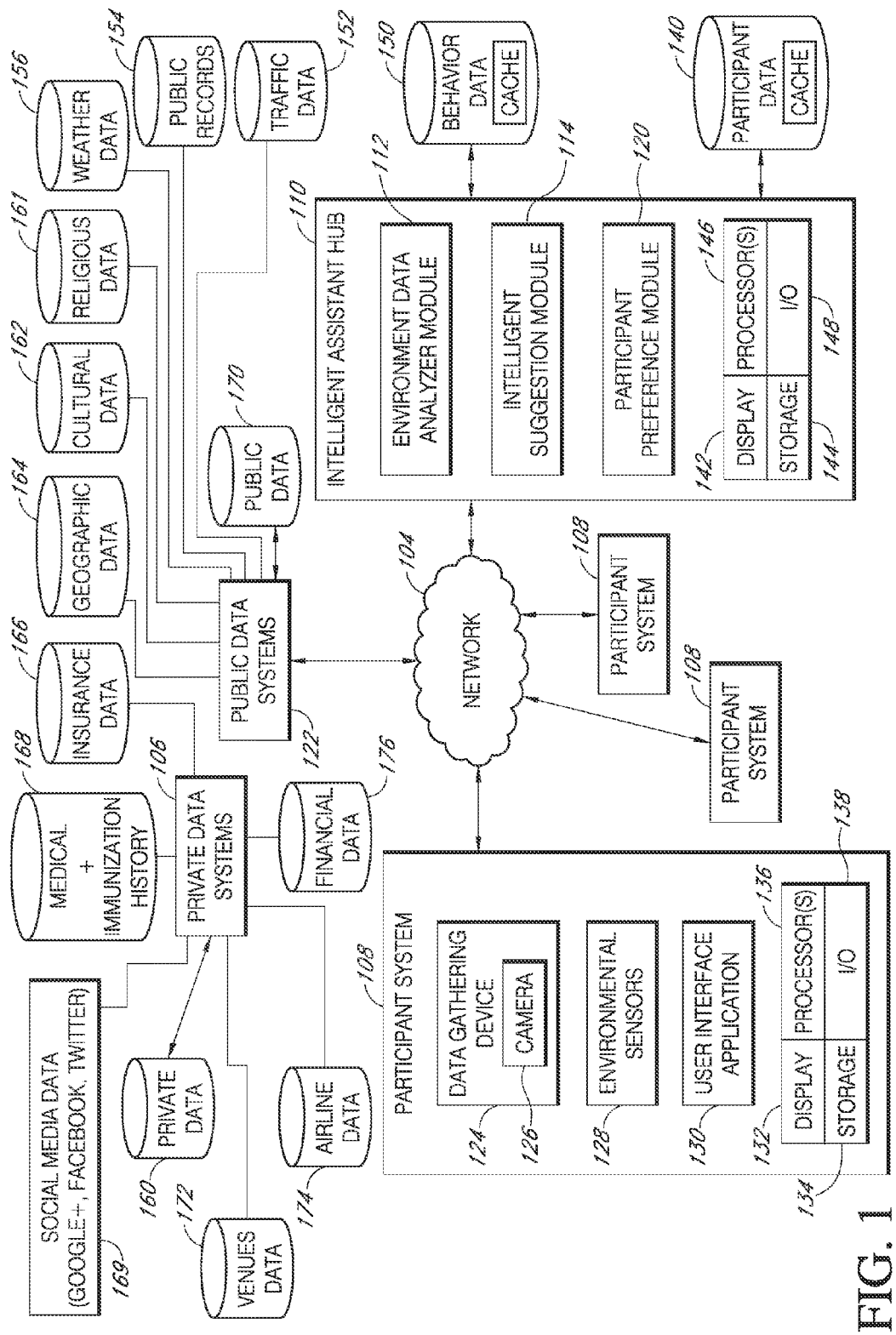
FIG. 1 is a block diagram illustrating an embodiment of the present disclosure that provides situational and global context aware calendar, communications, and/or relationship management.

Current calendaring, messaging, and CRM systems track and manipulate meetings, messages, and relationships between users. The present disclosure describes improvements to existing systems, such as improved methods of using the information collected by these systems, combining and comparing it with external context information (either from the environment, or recorded in a variety of public or private data sources) and outputting, in a variety of user interfaces, information to enable the user to act appropriately in an environment and to maximize usefulness of electronic meeting requests or other messages.

The present disclosure presents a variety of methods, systems, articles and apparatuses for calendar, communications, and relationship management and enhancement. In one embodiment, a computer obtains and/or generates a data set and performs analysis to automatically determine whether proposed or attempted meetings or communications are contraindicated by correlations between the proposed or likely participants (where the term "meeting" or "communication" is used alone herein, it should be understood that each term may include the other, and that a "meeting" may reference a desired or proposed meeting). Similarly, proposed or attempted meetings or communications (e.g., smart meetings), or alterations thereto, may be suggested by the intelligent assistant hub system, described with respect to FIG. 1 below, based on one or more correlations between the data set and the participants in the meeting or communication. In one aspect, the system may identify the likely acceptability of meeting times by ranges (such as 1 to 10), percentages, or groups (such as "clear", "possible issues", "likely conflict", and "known conflict").

Although meetings or communications may be between pluralities of people (participants), the term "Meeting Partner" (or primary participant), a broad term that encompasses its plain and ordinary meaning, may include the person with whom the system (or a user of the system or method) is attempting to communicate or set up a meeting with. While Meeting Partner is grammatically singular, it should be understood herein that even when used in the singular, it may include a reference to more than one person, as in the case of a meeting set up between a user of the system and ten other people (some, all, or none of which may also be users of the system).

The systems and method described herein may improve electronic meeting requests through the use of "smart meetings," which are automatically generated and/or interactive meeting request (or management) tools that may make specific recommendations to a user based on detected context data, or may wholly create new meetings (or update existing meetings) based on detected context data. As an example, in one embodiment, a user (primary participant) who will be in Brazil from Apr. 20-24, 2011 may wish to set up a meeting with a participant who is an observant Jew and another participant who is a vegetarian. The system can obtain data pertinent to the potential participants, for example by being provided data, by analyzing public and private sources, by analyzing social media such as by analyzing the Twitter™ feed of participants, etc. When the user attempts to send a meeting invitation for April 21, the system informs him that it is Tiradentes' day, a public holiday in Brazil. When the user attempts to schedule for the evening of April 22, the system warns him that April 22 is a Friday and one of the participants has indicated on Twitter that he is an observant Jew, and for observant Jews, Shabbat prevents working after sundown on Fridays, which is 5:34 p.m. on that particular day. The system may then inform the user of the best meeting time or times, considering traffic patterns, likely times that participants will be tired due to jetlag (having calculated their prior time zone, if available how long they had been in that time zone, and how long they would have been in the meeting time zone prior to the proposed meeting time) or other factors (such as the length of time between the last flight together with the length of the flight, and even class of service, which together provide clues as to likely participant fatigue), the schedules of the participants, the conflicts with local holidays or traditions, the conflicts with participant holidays, traditions or observances, venue availability, cost of transportation to the proposed meeting place as it varies with date and time, and cost, availability, condition (such as how crowded a restaurant may be) of the meeting place, and/or any other data associated with the planned meeting that may be useful.

As the example depicts, the system may access and/or use a variety of databases or data stores in order to improve meeting requests (or other messaging or environmental awareness). These data stores may include databases and information stores that are unavailable to calendaring or scheduling applications. For example, Microsoft Outlook stores calendaring or scheduling information about its individual users (such as the times when they are available or unavailable), or may store calendaring or scheduling preferences for each user to assist in scheduling meetings (such as blocking out time on all Thursdays to prevent any meetings occurring for that user on those days). Microsoft outlook uses this information to assist in creating meeting requests. However, Microsoft Outlook does not have access to, and does not make any scheduling decisions on, non-calendaring-application information, non-scheduling information, and non-scheduling (or non-calendar) preferences. The current disclosure, however, does describe how to use context information (e.g. non-calendaring-application information, non-scheduling information, and non-scheduling (or non-calendar) preferences) to assist in formulating smart meeting requests, performing meeting scheduling, providing smart messaging, and making CRM decisions, among other computerized actions.

Referring to FIG. 1, this figure is a block diagram that shows how the system may be connected, according to one embodiment. The Intelligent Assistant Hub 110 (also referred to herein as "the system") may comprise an Internet connected computer server, servers, or cloud system, and has access to many networked databases. For example, Intelligent Assistant Hub 110 may have access to behavior data 150. This behavior data may comprise stored behaviors, such as behavior rules. For example, a stored behavior may comprise an electronic rule indicating that "if a person has eaten at restaurant Y X times, then the person prefers restaurant Y." The variable X may be a threshold for the comparison and can be set automatically based on observed information in comparison to user preferences, or set by a user or administrator. Stored behaviors may apply to many scenarios and are used, in the typical case, to make an educated guess based on observed or gathered data that may be used by the system to categorize a target, participant, item or location, among other things. A stored behavior need not require a threshold. A stored behavior, as used herein, is a broad term, and encompasses its plain and ordinary meaning, and may include rules about human behavior as described above, but may also include rules about behaviors or attributes of locations or items.

Behavior data 150 may also store other behavior information in addition to stored behaviors. For example, behavior data 150 may store locally, for the intelligent assistant hub 110, data gathered from one or more private databases 106, public databases 122, or participant systems 108. This data may be a copy of the data in those databases, or may be analyzed, summarized, or processed data from those databases. For example, data from geographic data store 164 may be gathered by intelligent assistant hub 110. This data may comprise data indicating that Brazil has an average humidity of 41%. This data may then be compared to a stored behavior when a user is attempting to initiate an electronic meeting request for a meeting in Brazil. The intelligent assistant hub may compare the 41% humidity value for Brazil to a stored behavior that indicates that all meetings should be held indoors if humidity exceeds 40% in any location. Such a behavior rule may be set by a system administrator, by the meeting coordinator, based on data associated with other planned meeting participants, etc. Behavior data 150 may also include a cache. This cache may allow for quick access to behavior data that is frequently accessed, or for outside database information that is frequently gathered.

Participant data 140 may also be accessed to either create a stored behavior, or to be compared to stored behaviors. Participant data may include data gathered from environmental sensors 128 across one or more participant devices 108. These sensors may be gathering health, location, temperature, image, audio, and/or other contextual information on a periodic, intermittent, or constant basis. For example, a participant system may record the temperature in its current location every 5 minutes, and send the current temperature and location value pair to the participant data database 140 for storage. Or it could record all images and associated metadata for the images (time taken, location taken, etc.) that were taken by the participant device 108 with camera 126. This information may then be sent to the Intelligent assistant hub 110 and stored (either analyzed, summarized or in raw form) in the participant data database 140, which may comprise a local database (or other data structure) and/or a cloud based system.

Participant data 140 may also store tracked participant users' actions within the system. For example, the intelligent assistant hub 110 may track explicit or implicit preferences of participants. As an explicit preference, a user may be able to state that they prefer to eat at Mexican food restaurants, or do not prefer coffee houses as meeting locations. Alternatively, or in combination, the system (such as the participant preference module 120) may track user interactions to implicitly determine these preferences. For example, if a user declines invitations for meetings at Italian restaurants three times, then the system may analyze this information and conclude that the user prefers not to eat at Italian restaurants. This preference detection could also be expressed in terms of a stored behavior. Like behavior data 150, participant data 140 may also include a cache. This cache may allow for quick access to participant data that is frequently accessed.

Intelligent Assistant Hub 110 itself may support and implement traditional calendaring and messaging features, or may work in conjunction with one or more other calendaring and/or messaging systems. In addition, the Intelligent Assistant Hub 110 may implement portions of the system that use a variety of modules or sub-components (which may be implemented in hardware and/or software, in a single computing device or across multiple computing devices).

The environment data analyzer module 112 may be configured to communicate with participant systems 108, public data systems 122, private data systems 106, behavior data 150, and/or participant data 140 (or other sub-components). The environment data analyzer module 112 may, among other functionality, analyze data to determine new stored behavior rules to store in behavior data 150, or analyze incoming environmental sensor data or meeting request data, and compare them to stored behaviors to make a behavior determination. These comparisons may trigger outputs helpful for setting up meetings or informing participants, as disclosed generally herein, or may be passed to the intelligent suggestion module 114 or participant preference module 120 for further analysis.

In some embodiments, the intelligent suggestion module 114 may itself be configured to analyze incoming environmental sensor data or meeting request data, and compare them to stored behaviors to make a behavior determination. Like the environment data analyzer module 112, the intelligent suggestion module may compare observed data to stored behaviors in order to provide suggestions, warnings, notifications, tips, etc. to participants when those participants are using the system (or possibly to non-users of the system, such as with an invitation to enroll in a service provided by the system to continue to receive similar notifications). When a stored behavior is met, the intelligent suggestion module 114 determines the appropriate suggestion(s), warning(s), notification(s), or tip(s) (or other information) to be sent to a participant system and to be displayed (and/or stored).

The participant preference module 120 may be configured to access (and store) participant data 140, receive and store explicit user preferences, and determine and store implicit user preferences based on tracked participant data.

The intelligent assistant hub 110 and its sub components, whether implemented in the cloud, across multiple servers, or in a single server, may comprise display 142 for displaying output to an administrator or user, non-transitory storage 144 such as memory, hard drive, or other permanent or semi-permanent storage (e.g., magnetic, optical, volatile and/or nonvolatile semiconductor memory), and processor(s) 146 that may execute programmatic instructions stored in storage 144 to execute and implement via software and/or hardware the systems and methods herein. The intelligent assistant hub 110 may also comprise other I/O component(s) 148 such as other input, audio and networking components.

A participant system 108 (also referred to as a "user system" or "user device" with reference to certain implementations, such as the global time synchronization embodiments), in general, may be used by the participant to initiate messages and calendaring requests, received warnings, tips, notifications and messages, and/or otherwise interact with the system. A participant system 108 may comprise a computer (such as a pc computer, mac, or laptop, running any operating system), mobile device, tablet, smartphone, smartwatch, smart glasses, or other networkable devices. The participant system 108 may comprise display 132 for displaying output to an administrator or participant, non-transitory storage 134 such as memory, hard drive, or other permanent or semi-permanent storage (e.g., magnetic, optical, volatile and/or nonvolatile semiconductor memory), and processor(s) 136 that may execute programmatic instructions stored in storage 134 to execute and implement via software and/or hardware the systems and methods herein. The participant systems 108 may also comprise other I/O component(s) 138 such as other input, audio and networking components. In some embodiments, certain functionality, modules, software and/or hardware, of one or more participant systems 108 and the intelligent assistant hub 110 may be combined into a single device. For example, in one embodiment a participant system 108 may include software functionality to perform methods discussed herein with reference to the modules 112, 114, and/or 120 of the intelligent assistant hub 110.

A participant system 108 may also include one or more data gathering device 124, such as a camera 126 and/or other environmental sensors 128. These components may be used to gather environmental data that is processed by the environment data analyzer module 112, the intelligent suggestion module 114, and/or the participant module 120. A participant system 108 may also comprise a user interface application 130, which may include a computer application or mobile application, that may implement CRM, calendaring, or messaging functions, in addition to providing smart meeting and contextual messaging user interface support. The user interface application 130 may communicate with the data gathering device 124 and the intelligent assistant hub 110 using traditional operating system communication or networking techniques. In various embodiments, other computing devices are discusses. Each such computing device may include some or all of the components discussed with reference to the participant system 108 and/or intelligent assistant hub 110. The use of "non-transitory" herein is to be understood to exclude only propagating transitory signals per se and does not relinquish right to all standard computer-readable media that are not only propagating transitory signals per se. Therefore, the meaning of "non-transitory tangible computer readable medium" should be construed to exclude only those types of transitory computer-readable media which were found in In re Nuijten to fall outside the scope of patentable subject matter under 35 U.S.C. §101.

The intelligent assistant hub 110 may access a variety of databases in order to determine triggerable stored behaviors or for comparison to stored behaviors, in addition to the stored behaviors already stored in the behavior data database 150 and the participant database 140. These databases may be used in order to make determinations about individuals, or groups of individuals, and may be received or analyzed, or reported with in an anonymous manner if necessary.

For example, the intelligent assistant hub 110 may access one or more private data systems 106 that each have data on one or more participants, or one or more contacts of participants, such as financial data 176 which may include banking data, investment data, spending habit data, credit card data, and/or other financial data. Airline data 174 (or other travel enterprise data) may be used to track an individual's flights, flight schedule, on time information, or to model stored behaviors across a general population with regard to travel. Venues data 172 may track availability of venues, as well as attributes of venues (such as the kind of food a venue serves, its average temperature, seating arrangements, etc.). Social media data (for example, Twitter, Google+, Facebook, Instagram, Pinterest, etc.) may be accessed, including all of the related images and text associated with a user. Medical history and immunization history data 168 may also be accessed, for example, to determine whether it is safe for a user to travel to a foreign country for a meeting, or whether certain foods that are being eaten may conflict with a user's history of heart disease. Insurance data 166 may also be accessed to make a correlation with a participant's driving habits (such as whether they typically drive fast or slow based on number of speeding tickets received), or to determine how risk averse a participant is.

Public data systems 122 may also be accessed for similar purposes. For example, geographic data 164 (such as average temperature, national holidays, popular diseases, etc.) for an area may be accessed to inform meeting requests and make decisions about logistics for meetings that are occurring. Similarly cultural data 162 or religious data 161 may store religious or cultural holidays, traditions, or faux pas that may be used to smartly organize meetings or to warn a user of potential embarrassment when dealing with people of specific religions/cultures. Other public data may be accessed, such as weather data 156 (yearly weather patterns, 10 day weather report for an area, etc.), public records (such as business or corporate registrations, criminal records, etc.), and traffic data (such as average fastest ways to drive, or current traffic delays).

The above databases are only examples of the type of data that may be accessed by the system, but the system is not limited to accessing only these databases, or accessing them only for the reasons cited above. Each of these databases may be used to determine related behaviors for an individual, or general behaviors across a population for determining new stored behaviors.

Example Generation of Stored Behaviors

Figure 2:
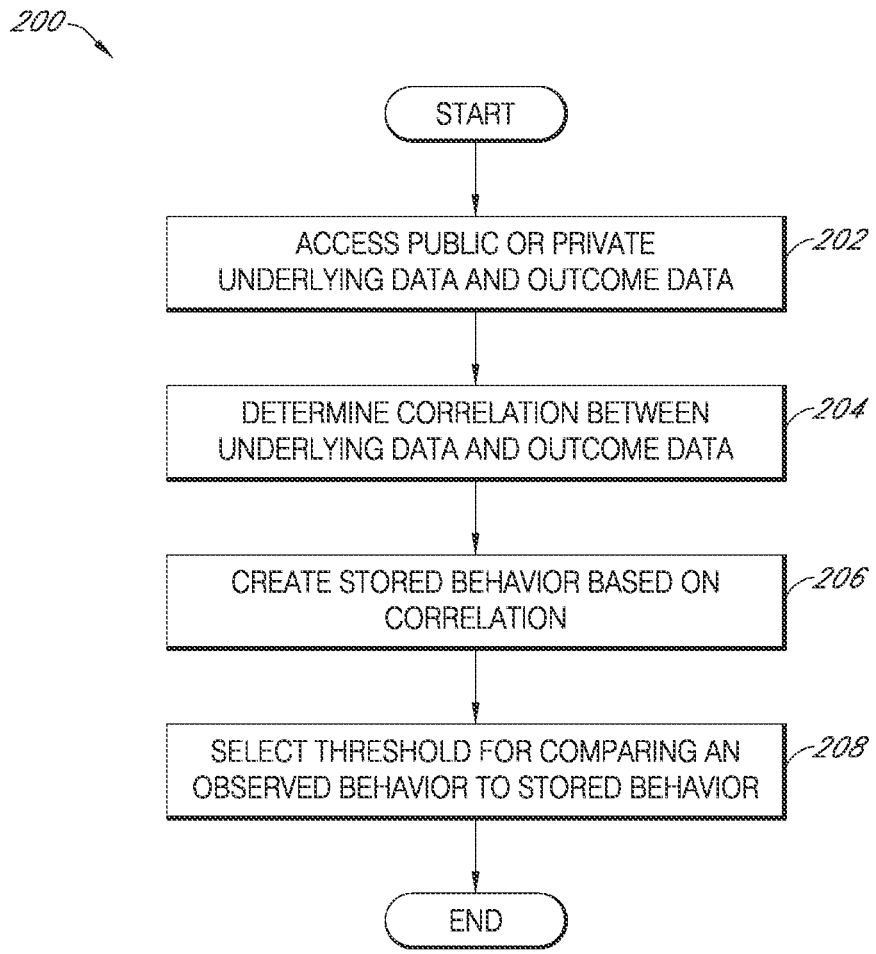
FIG. 2 shows a flowchart depicting illustrative stored behavior creation operations of the system, according to an embodiment of the present disclosure.

Referring to FIG. 2, a process is described for creating and storing stored behaviors used by the system to enhance CRM, calendaring, and messaging functionality, according to one embodiment. Depending on the embodiment, the method of FIG. 2 may include fewer or additional blocks and/or the blocks may be performed in an order that is different than illustrated.

In block 202, one or more data stores of the data stores described herein (but not limited to the data stores described herein) may be accessed for both underlying data and outcome data. Underlying data, is a broad term, and may include its plain and ordinary meaning, and also include any data that may be used to correlate, determine causation for, or model a stored behavior. Outcome data is a broad term, and may include its plain and ordinary meaning, but may also include any data that is dependent on underlying data. For example, traffic data may be accessed and transmitted from the traffic data database 152 to the intelligent assistant hub 110, including the volume of cars travelling a specific highway during certain time periods, and the speeding traffic tickets issued for that specific highway during the same time periods. In this example, the volume data may be considered the underlying data, and the traffic ticket data the outcome data (or vice versa depending on which direction the correlation is calculated).

In block 204, the intelligent assistant hub 110 and/or its subcomponents may then correlate (or otherwise model, or determine causation for) the underlying data and the outcome data. For example, a correlation may be calculated that states that if volume of cars increases, then speeding tickets decrease. In this case, the underlying data may be considered the volume of cars, and the outcome data the decrease in speeding tickets.

There are multiple embodiments for determining causation or correlation. For example, predictive modeling may be used including neural networks, heuristic models, statistical models, regression models, linear regression models, discrete choice models, logistic regression, multinomial logistic regression, probit regression, time series models, survival or duration analysis, classification and regression trees, machine learning, multivariate adaptive regression splines, multilayer perceptron, radial basis functions, support vector machines, and/or Bayesian modeling, among others.

Other correlation techniques do not require modeling. For example, if a religious database indicates that the Jewish faith requires their followers to not work on a high holiday, no additional analysis may be necessary for this stored behavior. The system simply records that, if the date matches a high holiday and a particular participant or user is Jewish, this stored behavior may be triggered.

In block 206, after determining the causation or correlation, the system may store or record the analysis within the behavior data database 150 (e.g., a stored behavior). Various parameters may be included in the stored behavior, including the strength of the correlation or causation.

In block 208, optionally, the system may determine a threshold for the stored behavior. In one embodiment, this determination may include analyzing (for example, via various models described above), the strength of the correlation to determine a threshold at which an observed behavior (e.g. a potential observed behavior or cue) may match a stored behavior. Using the car volume and speeding ticket example, the system may determine that, if car volume increases to a certain amount, then the stored behavior will trigger an indication that the risk for a speeding ticket has been significantly reduced. The stronger the correlation, the less of an increase that may be required, and thus a lower threshold may be allocated to the stored behavior.

Example Comparison of Observed Behaviors to Stored Behaviors

Figure 3:
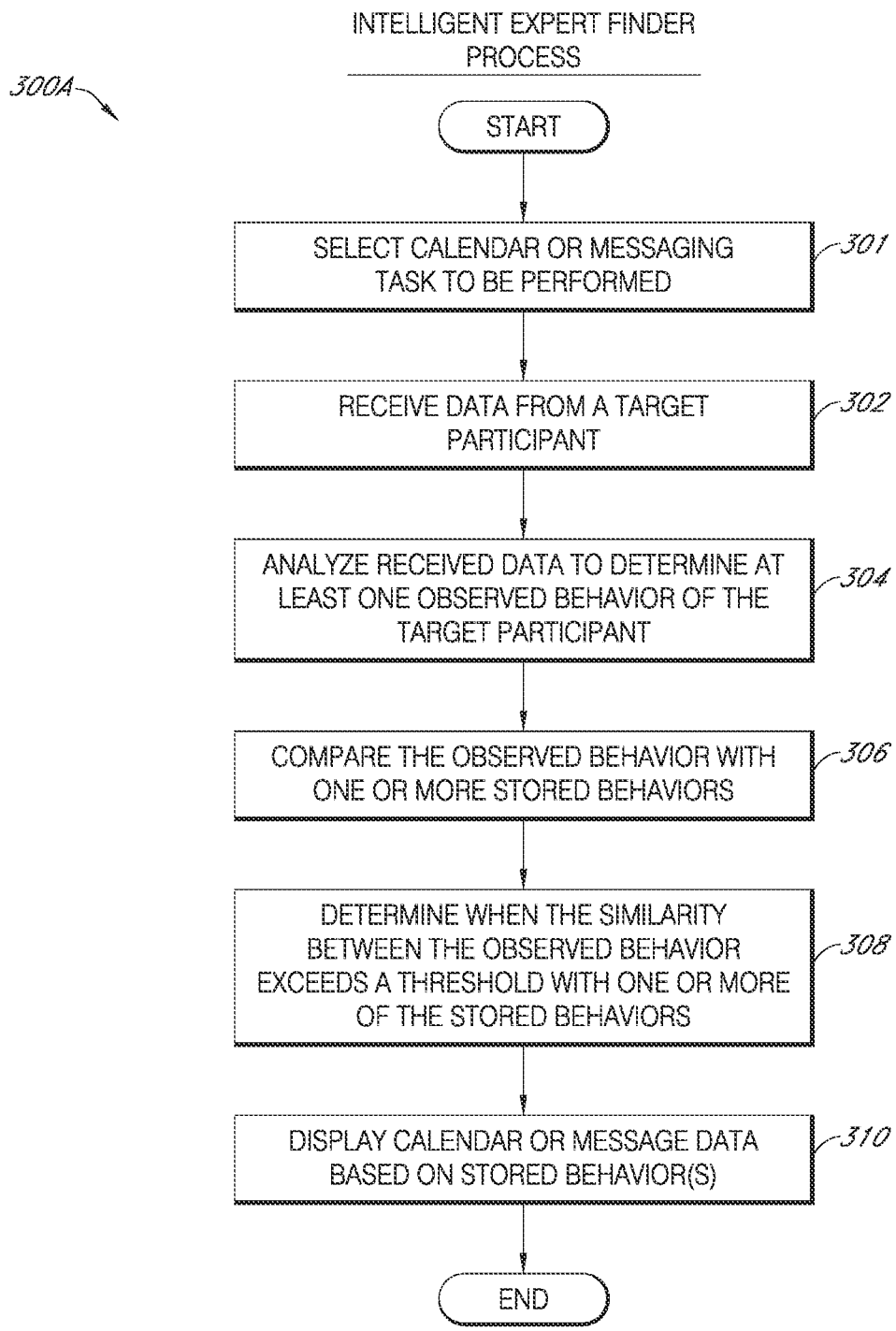
FIG. 3 shows a flowchart depicting illustrative stored behavior comparison operations of the system, according to an embodiment of the present disclosure.

Referring to FIG. 3, an example of how to use a stored behavior to enhance calendaring, messaging, or CRM functions is described according to one embodiment. Depending on the embodiment, the method of FIG. 3 may include fewer or additional blocks and/or the blocks may be performed in an order that is different than illustrated.

In block 201, the participant or user may select a calendar, messaging, or CRM task to be performed. This may include, by way of example, the user preparing a new meeting request to meet a potential customer, preparing an email to a supplier regarding new opportunities, or adding a new contact to a CRM system. User interaction is also not required. A user need not be the initiator for selecting a calendar, messaging, or CRM task. For example, a meeting or message task may be triggered automatically without user intervention, such as whether or not to send a message that notifies a participant that a meeting should be rescheduled due to an attendee's illness learned of through a social media context.

This may also include the participant device 108 or intelligent assistant hub 110 performing automated tasks. For example, the participant device 108 may be monitoring a user's location. The participant device 108 may also be aware of the user's calendar, including a meeting at 2 pm. The participant device 108, as a part of block 201, may automatically initiate a check to determine whether, based on their location and current traffic, the user will reach the destination before 2 pm without any interaction by the user.

In some embodiments, other data associated with the participant may be automatically monitored, such as in response to the participant device 108 (and/or one or more other public or private data sources) providing data to the intelligent assistant hub 110 and the intelligent assistant hub determining which stored behaviors to check based on the data received, which may include the current status of the participant, where he is located, the type of person he is meeting with, etc.

In block 202, the participant device 108, and/or the intelligent assistant hub 110 may receive, data about the target participant. Using the example above (but not limited to this example), the data transferred may include the stored behavior(s) to be checked (traffic speed/destination estimate), the potential observed behavior data (current location and speed, or any traffic cue), and any other parameters the stored behavior check may require. Alternatively, no stored behavior may be specified.

In block 204, the received data is analyzed to determine at least one observed behavior of the target participant. The intelligent assistant hub 110 and/or its sub-components may analyze the received potential observed behavior data to determine whether the data indicates an observed behavior. This may comprise selecting certain received data (including, but not limited to, using all received data without a selection) for use in checking against stored behaviors.

In block 206, the observed behavior may be compared with one or more stored behaviors. This may include whether the received data matches the one or more stored behaviors to be checked. In other words, is the data sufficient to match a possible stored behavior.

In block 208, optionally, the system may determine when the similarity between the observed behavior exceeds a threshold with one or more of the stored behaviors. As disclosed herein, a stored behavior may have a threshold. For example, some observed behaviors will not trigger (or cue) a stored behavior because the observed behavior data did not meet a threshold required to trigger the stored behavior (e.g. is the distance between the participant and another user sufficient to trigger a stored behavior that indicates that the participant is standing too close to another person in a given culture). Other stored behaviors may not have a threshold (e.g. an indicated holiday for a Jewish person), and are more binary checks.

In block 210, the intelligent assistant hub 110 may transmit, to the participant device 108, an output based on determining one or more triggered stored behaviors, where a "triggered" stored behavior is one that has been matched by the observed behavior of the participant. The participant device 108 may then display (or otherwise notify the participant, such as via audible signal), in the context of the current user's interaction (such as a meeting request, message, CRM interface, or in a notification, or warning, etc.), information based on the triggered stored behavior. For example, if the stored behavior that was triggered corresponded to a notice that an invitee to a meeting request is Jewish and would not likely make a meeting on a Friday, that information may be displayed within the meeting request, or otherwise communicated to the user through the participant device 108.

Example Participant Notifications

By way of illustration, multiple embodiments of the context aware system described above will be discussed.

For example, in one embodiment, the system may use real time data. For example, if a participant's meeting is in downtown Los Angeles and the participant is in Santa Monica, the system, based on previously stored behaviors correlated and created based on the data disclosed above, can alert the participant to leave at a particular time, taking into account current traffic, predicted weather, participant's driving history and average speeds, the importance of being on time (more conservative v. less conservative departure time), and/or other factors. In some cases, as the participant is running late, the system could alert the participant to drive faster and/or notify the other participants of the participant's status, etc. The system can also be connected with GPS data and could inform the participant if she has taken a wrong turn or assist in directions to get to the meeting. The system can also alert the participant if the meeting time is modified by other factors, for example, if other participants are also running late. The system can balance meetings by priority, so if other participants of the meeting are running 30 minutes late, it may send a cancel notice to those participants or prompt to send a cancellation notice so that the participant is not late for another meeting. In one embodiment, if the meeting is cancelled, it should rearrange the participant's schedule and notify.

Among other factors, in addition to the data sources described under FIG. 1, the system may incorporate data (which can be understood as including both planned and predicted data) about national holidays, cultural holidays, exchange rates, climate forecasts, climate patterns, the statistical likelihood, for certain times and places, of climate extremes such as monsoons or hurricanes, actual predicted climate extremes, long-term climate trends, special events, strikes, civil unrest, travel restrictions, travel safety, reliability, nature, availability and cost of travel to a destination, reliability, nature, availability and cost of travel within a destination, political events, political stability, geopolitical threats, proposed or pending laws or regulations, legality of transport of required or desirable items, such as prescription medicines, to a proposed destination, cost, and availability of local talent, communications and infrastructure availability, nature, cost, and reliability, availability, nature, cost and reliability of translators, similarity between local language and participant languages, and frequency with which persons likely to be encountered during travel (such as cab drivers) speak the participant's language sufficiently to avoid errors or misunderstandings.

In one embodiment, the system may have access to a data set with public and/or private information about the participants in the meeting or communication. An embodiment of a method of populating the participant data 140, used to determine stored behaviors and/or observed behaviors (based on potential observed behaviors or cues), and/or update other databases, is described below. For example, public data systems/public data sources such as the Google™ search engine, Google+™ Facebook™, LinkedIn™, the Bing™ search engine, travel sites (sites herein may include databases), airline sites, sunrise/sunset calculation sites, Wikipedia™ or other general data sources, IP address geolocation sites, name analysis sites such as ones that provide an inference about age, religion, national origin or other characteristics based on name, genealogy sites, personal data compilation sites, traffic tracking sites, weather tracking sites, weather prediction sites, real-time and historical flight data sites, and Twitter™ may be sources of information. Some information may be input directly, such as a database of holidays for certain countries. Other information may be determined programmatically, such as sunrise or sunset times. A further aspect may include obtaining and/or sharing such data via at least one application programming interface ("API"). A further aspect may include obtaining data by impersonating a user of a service, such as by utilizing the Facebook™ or LinkedIn™ credentials for the user on whose behalf the system is operating. In one aspect, the terms of service for sites may be categorized, either programmatically, manually, or by a combination thereof to determine whether such impersonation or other access is acceptable. In one implementation, terms of service and applicable laws may be analyzed, and/or a database of pre-analyzed terms of service and/or applicable laws accessed, and a determination made as to whether a particular data source may be utilized.

Additional data sources may be utilized. For example, Lexis/Nexis™ and other paid and/or private data systems/sources are available.

In one aspect, previous presentations, PowerPoint or similar presentations, speeches, and other data may be utilized. In one aspect, video and photographs may be identified using face recognition technology, and voice data may be identified using voice recognition technology. The content of the data may also be analyzed to identify the origin and relevant data within such content.

A further aspect may include caching some or all such data, such as in the behavior data cache 150 and participant data cache 140, and refreshing the cache after a certain amount of time (or in conjunction with the first use of the data after the passage of such amount of time), and/or after the occurrence of certain events, which amount or events may vary by data source and/or analysis target. A further aspect may include refreshing the cached data after different amounts of time depending on the type of meeting or communication or whether the cache contains sufficient data. Such caching policies may be combined in whole or part. A further aspect may include identifying the most recent geographic location from one or a plurality of data sources, where such data sources include geographical location of a user posting data (or associated with posted data). A further aspect may include identifying any people recently or currently with another person, which data may be obtained from data sources that record that one person is near or with another person. Proximity in time and place may be used to infer that people were at or near the same location at the same time. Uses of such data include an automated system to identify associations between people, identify witnesses to an event, allow emergency messages to be sent to persons who are near the person intended to receive the message, to detect improper contact (such as monitoring a parolee who is not permitted to be near children or a person who is subject to a restraining order), among other uses.

A further aspect, in addition to the data sources listed in FIG. 1, may include monitoring network traffic (including via techniques such as packet sniffing, proxy server monitoring, monitoring at a router or switch level, cached data analysis, screen scraping, a browser plug-in that accomplishes or assists in data capture, or other methods). In an aspect, monitoring may be limited to the capture of data meeting certain criteria, such as data useful for the systems and methods described herein.

A further aspect may be the establishment and/or use of a network of wireless MAC address detectors, wireless network detectors (in particular with reference to mobile hot spots), and other mechanisms capable of identifying a unique or likely unique wireless identifier or transmission. Such detectors would report such data and the data may be utilized to infer the location of a person, or of some number of persons within a group of persons with access to the device emitting the unique or likely unique identifier or transmission.

A further aspect is analysis of other available data, such as analysis of files stored locally or over a network and available to the user. In one implementation, files not generally available to the public, such as over a non-authenticated internet connection, but available to a user or organization, may be indexed or mined for data. In one aspect, only data useful for the systems and methods described herein would be obtained.

It should be understood that while various aspects describe access to, or analysis of, very large amounts of data, such as the data sources described under FIG. 1, a far smaller set of data may be utilized. Indeed, in one implementation only data manually input by a user may be utilized. Similarly, regardless of what data may be utilized to begin with, the system may be programmed to heuristically determine additional data and/or to determine the relevance of extent data. For example, a user who always rejects meeting invitations taking place after sunset on a Friday but before sunset on Saturday may be scored as likely to be an observant Jew (e.g., may have that indication added to a participant profile stored in the participant data 140, possibly with an indication of a score or confidence level that the determined attribute of the participant is accurate). While a more simple scoring mechanism (such as "unlikely to accept Friday night meetings") may be useful as well, it does not provide the additional data associated with a determination of the cause of the scheduling pattern. Identifying the cause—in this case, that the user is likely an observant Jew—allows the system to provide additional guidance, such as arranging a meeting at a restaurant that has Kosher options available. Two or more individuals exhibiting similar patterns (or who are related) may be inferred to be more likely to share other patterns, particularly where there is insufficient data about at least one of the individuals with regard to such pattern.

Data from Facebook™, Twitter™ and certain other services feature status updates that include very current data, often including the geographic location where an update was posted from, the time and date of an update, and, in some cases, the people who are with the person posting the update. Indeed, services such as Foursquare™ and Facebook™ allow people to expressly "check in" to locations and post that information to publicly available databases (note that in some cases, data access may be restricted by user choice, privacy policy, or for other reasons). Where data about one person is not available, known associates of that person may be used as search keys to determine if they have indicated where the person is located or has been located. Even without an express indication, an inference may be made based on past activity. In one aspect, an application running on a (portable for the most part, although fixed may work when reporting when a user returns to a known location) device may be used to communicate with the intelligent assistant hub 110 to provide the location of the user and/or information usable by the intelligent assistant hub 110 in determine that location. Venues may report the presence of computers or devices hooking up to (or visible to) their networks via MAC address or other unique code.

With regard to caching policy, and with respect to FIG. 2, behavior data cache 150 and participant data cache 140, current status updates may be retrieved every time the system is utilized, for example. In another aspect, once a sufficiently current update (or other data point) is found, the system may be programmed to cease searching additional databases for the same data. For other data, such as a person's religion, caching policy may dictate that the information only be refreshed at lengthy intervals, only when the information is retrieved as part of another search, or by the sooner of the two to occur. Note that data collection or analysis via the analysis of cached data, such as in a user browser, in order to populate one or more of the data sets is normally a completely different cache than used by the system, although in certain cases there may be partial or full sharing of cache contents or space.

Cross-updating of records is an additional feature that may be present in some implementations. For example, if Joe's record was last updated ten days ago and is thus within the "use cached data" window, but updated data about Joe is retrieved in the course of obtaining data about his office-mate Fred, Joe's data may be updated as well.

In one aspect, data regarding associates of the primary person or persons with whom communication or a meeting is desired may be gathered by the intelligent assistant hub 110. Data on such associates may be tracked and correlated with the primary person or other associates. Similarly, data incidentally obtained pertaining to associates of a person may be stored in a cache or database in order to reduce the requisite data retrieval in the event that data about that associate or associates needs to be obtained in the future (such as if that associate accompanies the primary person to a meeting).

In one aspect, as another data source, heuristic, correlation, or other analysis of communications may be utilized to determine the characteristics of a communication that receives a desired type of response. For example, emails sent to a user that are under 100 characters long may receive a brief but fast response. Similarly, emails sent to a user after 3:00 p.m. on a Wednesday may never be returned before Thursday morning, and even then are returned with a brief response. The user may be asked to rate or categorize the type of response in order to populate such a database. Alternatively, or in addition, automated analysis or modeling may be done to rate or categorize the type of response. In one aspect, the utility of the response may be measured by the way the user utilizes or interacts with it. For example, responses that frequently elicit a meeting scheduling request, a lengthy response, or a long time spent reading the response may be scored accordingly.

Users may also "vote" or rank the quality of system performance in order to provide additional guidance for the system to adjust its rating system and behavior.

As another data source, the volume and type of inbound communications from a sender may be utilized to determine characteristics about the sender, which characteristics may additionally be used to further improve the predictive capabilities of the system. It should be understood that acceptance, type of acceptance, characteristics of acceptance, non-acceptance and characteristics of non-acceptance of outbound communications to the person being analyzed may be utilized in addition to, or in place of, inbound communications for these purposes. In one aspect, telephone records, SMS records, email records, Facebook™ communications records and other records may be analyzed to determine when communications take place, the type of communication, the modality, and other characteristics. For example, the intelligent assistant hub 110 may analyze such records and determine that on 95% of days, no communications come from user Joe between 3:00 p.m. and 3:50 p.m. on Wednesdays, and may infer that Joe has a recurring appointment during those times. Similarly, the system may determine that communications with Joe occur via work line 80% of the time before 5:00 p.m. on workdays, by cellular phone 80% of the time after 5:00 p.m., 50% of the time by cell and 50% of the time by home phone after 6:00 p.m., and 99% of the time from the home phone after 7:00 p.m. The system may also determine the normal commute time between Joe's work and home (and may even use traffic, weather or other data for specific days on which communications being analyzed took place) and may infer that Joe normally leaves work at or around 5:00 p.m., sometimes stops on the way home, and is almost always home by 7:00 p.m. Accordingly, the system may route communications in a manner that accommodates the travel schedule (for example, by not sending SMS messages during Joe's commute time if Joe lives in a state where it is illegal to text while driving, by holding the transmission of text or email messages until the normal commute time has expired, by routing a phone call to the most likely phone system to answer, by warning the sender of Joe's schedule or seeking sender permission before altering the communication, or otherwise).

As an additional data source, the content of social media may be gathered and analyzed to determine stored behaviors for specific individuals. Feedback provided by potential meeting request or communications recipients, either with regard to a message sent by the system or by another method or by another user may be analyzed to determine additional characteristics of optimal communications or scheduling with such recipient. For example, if a recipient posted on Twitter™ "Don't you hate idiots who schedule while the Dodgers are playing?", future meeting requests may be correlated to not be sent requesting a meeting during a Dodgers game. If there was already a meeting request outstanding to such recipient in violation of the new preference, it may be withdrawn automatically, rescheduled automatically, or rescheduled with the consent of one or more participants.

Physical requirements may be compatible only in certain sequences. For example, when scheduling a meeting at a coffee shop, a networking basketball game, and a meeting in an office, the clothing required for the office meeting would be incompatible with that for the basketball game; if the basketball game preceded either of the other meetings, the person would need time to shower and care would need to be taken to make sure that the temperature in any immediately following meeting would not be so high as to trigger sweating as a result of the increased metabolism following exercise. In one implementation, the system would incorporate such requirements into the scheduling.

In scheduling meetings or even travel, the physical environment of the meeting participants (such as clothing) at each stage is of importance. In addition, desirable physical characteristics vary with cultural norms, cultural expectations, legal requirements, the physical characteristics of the person, the clothing worn or available to the person, and the preferences of the person. In one implementation, the likely temperature or temperature range in one or more potential meeting venues (or routes, hotel rooms, etc.) may be used to advise as to clothing to bring, to properly sequence events, to choose between a plurality of potential locations, etc. The system may utilize actual temperature or other data to replace projected data where actual data is available. For example, average hotel temperatures, the availability and types of hotel climate control, presence of patio heaters or misters at outdoor restaurants, average restaurant temperature may all be utilized to manage travel, meetings, and other events. Indeed, such information may be used to determine an appropriate place within a location, such as by reserving a table near the entrance in a restaurant that is overheated in the winter. Where meetings happen by audio or videoconference, the system may automatically correct errors or may augment features of the participants. For example, a man having a meeting with an orthodox Jew may offend that participant by not wearing head covering. The system may automatically add head covering to the transmitted digital image, such as a meeting invitation that is sent to that particular participant (various participants in a same meeting may receive different information in their corresponding meeting requests). Similarly, accents may be corrected, "pause words" such as "um" and "you know" may be eliminated, and other elements corrected. By maintaining a database of such information and/or gathering such information as needed, the system is able to better meet the needs of its users.

Example Smart Meeting Request

An example user interface for a "smart meeting" request produced by the system is depicted in FIG. 4, according to one embodiment. The meeting request user interface may comprise a plugin to a standard outlook (or other calendaring system) user interface. In other embodiments, the smart meeting user interface may be part of a stand-alone calendaring system provided by the system, or some combination thereof. For example, the user interface 400 shows a modified outlook meeting user interface that includes a smart meeting tab with additional features compared to a normal, non-context aware, meeting request.

The smart meeting user interface may automatically populate invitees based on context. For example, text input area 450 or subject text area 404 may contain information about the context of a meeting. Based on this information (and/or other information), the user interface may automatically select contacts from a participant's set of contacts (or contacts based on contacts known by the system) that would likely be invited to a meeting regarding the subject matter entered. This selection may be made based on information (such as individual stored behaviors) gathered about these contacts via the data sources listed in FIG. 1, or throughout this disclosure. This field population may be accomplished by local processing on the participant device 108, or by sending an electronic query containing the subject line 404 and/or text data 450 to the intelligent assistant hub 110 for processing. The intelligent assistant hub 110 may respond by transmitting to the participant device 108 a list of contacts (optionally including a likelihood indicator of attending, such as a list that is sorted to include the most likely participants first) that the participant device 108 or user may select from. The invitees field 402 may be populated with the results. This population may happen automatically, or via using suggest button 416 to initiate processing of recommendations. In general, any field that may automatically be populated with context aware information may be populated locally, or via a query/response process with the intelligent assistant hub 110.

For example, if a user entered "Meet to go over new kosher foods available to be distributed by Goldman's groceries" in field 450, and/or entered "Kosher Foods Sales Pitch" as subject 404, the system may analyze this information to recommend invitees in field 402. The contact Herbert Goldman may be in the meeting requestor's contacts. Intelligent assistant hub 110 may have stored behaviors about Herbert Goldman indicating that he is Jewish and runs a grocery store. Based on the subject matter text entered, the intelligent assistant hub 110 may search all of the contacts' stored behaviors for one that may match (as described in FIG. 3) the subject matter received. Based on this search, Herbert Goldman may be a contact that has a matched stored behavior based on his Jewish identify and/or grocery store. Once this information is transmitted back to the participant device 108, the user may select Herbert Goldman from a list of recommended contacts (or have it automatically populate the field without user interaction in other embodiments, for example, by meeting a likeliness threshold). In this way, the user may be alerted of possible participants to invite to a meeting that would not have otherwise been invited, but that may be valuable participants in the meeting.

Context aware information may also be used to populate the location in a meeting request. For example, like the invitees populated in invitees field 402, a location may be automatically populated in location field 406 or suggested (via suggestion button 418), based on context data known to the system. For example, using a similar process as described for invitees, the system may collect context aware information such as from the user, meeting subject 404, text data 450, invitees 402, and/or other relevant data, and determine one or more suitable locations for the particular meeting. For example, based on Herbert's past restaurant selections (and/or the requestor), it may be determined that Herbert Goldman (and/or the requestor) prefers bagels or deli sandwiches. Other factors may be used in determining a recommended location as described herein, such as opening/closing times, type of food, location, other preferences of the attendees, etc. Multiple locations may also be recommended, and/or ranked. For example, cursor 420 is located over ("mouseover") the location header. In popup box 422, multiple locations are described as recommendations, each with a match percentage that may rank how closely aligned each location is with user preferences or context constraints. In one embodiment, the user can select a location in the popup box 422.

The time selected for the meeting may also be automatically suggested or informed by context aware information. For example, meeting request user interface 400 contains suggested times for the meeting which may be based on analysis of both the participants' schedules, as well as other contextual information about the participants. For example, suggested time 408 does not list any suggested times on Friday because the system is aware that Herbert Goldman may not work on Fridays for religious purposes. Similarly, the Yom Kippur holiday may prevent any suggested times on certain dates. Suggested times 410 and 412 may be identified by the system as times that likely work for participants based on past observed meeting times or other observed data. For example, based on Herbert Goldman's potentially Jewish heritage, culture and/or religion, a suggested time 410 for Saturday may be after sunset. Suggested times may be highlighted, sorted, or otherwise distinguished from one another based on various factors such as times that are most convenient for the requester, times that are most convenient for the other participant(s), or some other factors.

In another example, the smart meeting may automatically make a reservation for the selected meeting location ("venue"). In this example, the Make Reservation button 426 may be selected by the user (or automatically performed in other embodiments or configurations) to make a reservation for the selected venue. The reservation may be made with contextual knowledge, such as the preference of users. For example, button 424 may be used to suggest certain tables for the reservation based on known restaurant seat maps and explicit or implicit observed preferences for temperatures (e.g., inside/outside tables), noise, etc.

In some embodiments, data may not be available in the form required for use by the intelligent assistant hub 110. For example, the temperature in a restaurant may not be available to the system. The system may pull images, video, audio, and text from various feeds such as Facebook™ and Twitter™, and/or from image search engines such as that provided by Google™. Such searches would, in one implementation, be limited to images bearing metadata indicating they were taken in the location at issue; to data that references the location at issue; or to posts or data meeting other search criteria. A data range or other limitations, such as matching a time of day or time of year, may also be implemented. The images and/or other data may then be analyzed to infer data in the form required for the system to analyze, to obtain direct data that the system or its users require, or to confirm the validity of extent data within the system. For example, if there were a meeting at "Joe's Steakhouse", the system might examine images recently taken within Joe's Steakhouse and observe that diners close to the kitchen and along the wall opposite the door were 50% more likely to remove their sweaters or coats than were visitors proximate to the door or windows. Similarly, the system might observe that drinks with ice were more likely to see that ice melt quickly at tables close to the kitchen, and that diners close to the kitchen were more likely to order cold drinks. Such information may be correlated to infer that the area near the kitchen is warmer than the area near the door and such information may be used by the system to guide reservations, to recommend table placement requests, or for other reasons. In one implementation, the system analyzes the data to identify individuals similar in weight, height, age, body type, gender, place of residence, or other factors and determines how the similar cohort is dealing with the venue. If, for example, a potential dinner meeting participant with a body mass index (BMI) of 45 were considering multiple venues, it would be informative to know among people with a similar BMI in images taken at the potential venues, the amount of sweating was lowest at venue A.

Additional data that the system may analyze would include public records related to the potential venue. For example, building permits issued for locations at or near the venue may indicate potential disruption or noise near the venue. Business licenses, restaurant health inspections, critical reviews, reviews by laypeople, and other similar data related to the potential venue or places en route to the potential venue (including conveyances) may all be used by the system.

Example Document Processing

Figure 5:
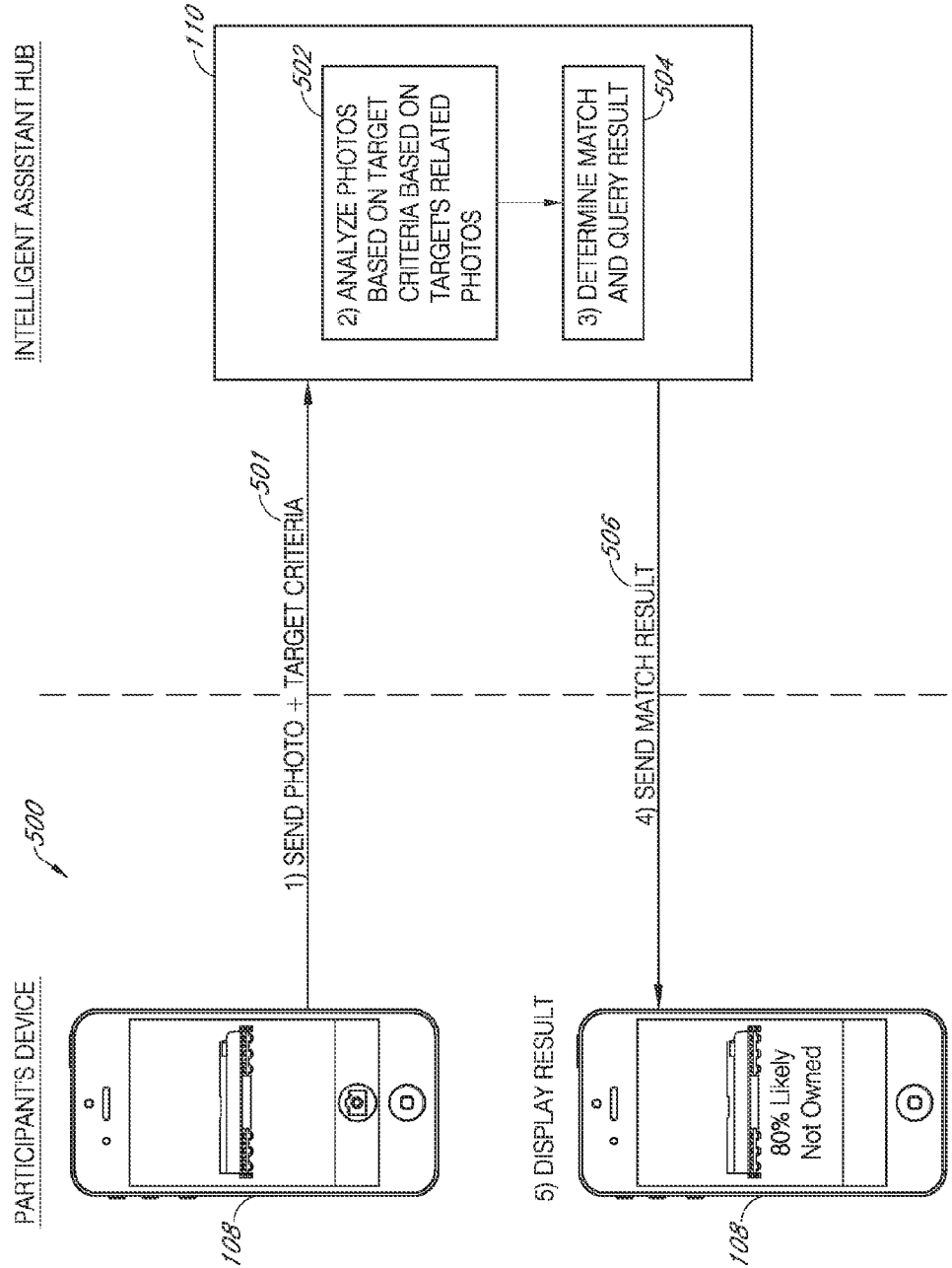
FIG. 5 shows a flowchart depicting illustrative image analysis operations of the system, according to one embodiment.

In another aspect, referring to FIG. 5, photographs, purchasing records, videos, and other data about other participants in a potential meeting or event (or in some cases those associated with participants) may be analyzed to determine appropriate clothing or other factors. Such data may be correlated with a database about the user of the system, with data provided by the user of the system, or a combination thereof. In one example, Jill is going to attend a networking event. The system has some data about Jill's available clothing, and Jill takes a photograph of the potential clothes she is considering wearing to the event. The system then analyzes the available data, such as images, of other participants and determines whether any of them wore identical or substantially identical clothes. In so doing, the system may then provide Jill with an analysis of the likelihood that she will show up at the event and find somebody else wearing the same outfit. Similar analysis may be done for other things.

In one implementation, as depicted in a flowchart of one embodiment in FIG. 5, analysis of photographs, purchasing records, and other data may be utilized to determine whether a potential recipient of a gift already has something identical or similar to the potential gift; whether the potential recipient has a possession that can be used to identify a complimentary gift (such as shoes that match a certain outfit, or a game that works with a particular gaming system), and/or the preferences of the potential recipient. In one example, a business associate's child may have been photographed playing with various toy trains, but no photograph showed the hot new toy train, "Example Train". In such a case, the system may identify "Example Train" as a potential gift. In addition, such a system may be utilized to pre-populate, add to, or otherwise enhance gift registries or similar lists. For example, using existing photographic data or photographs taken for that purpose, a couple may photograph their kitchen utensils, pots, and pans and the system would then identify the existing things in the kitchen, evaluate which of those items have aged, are of poor quality, or otherwise would be good candidates for replacements, and identify desirable items that are not present in the data set. Such items may then be added to the data set, presented to the user for approval prior to addition, or noted within the dataset as automatically generated.

FIG. 5 illustrates one possible embodiment of analyzing image context information in order to assist in selecting a gift (or determine Jill's clothes to wear). For example, in 500, a participant's device 108 is used to take a picture of a train engine that may be used as a desired gift (or a piece of clothing that may possibly be worn, etc.). The photo, along with the target criteria 501 may be transmitted to the intelligent assistant hub 110. The target criteria may contain the specific query from the user (or automatically generated by the device), such as data indicating a question about the likelihood of whether a particular train engine is owned by a toddler, or whether there is a significant chance that a user will show up at a party with the same outfit. A mobile device application may be configured to respond to a particular query, such as whether a social network friend owns a particular product, such that separate applications are usable to response to other queries. Alternatively, an application may include multiple queries that are selectable by the user and/or are parsed from natural language text provided by the user (whether typed or orally received). The query may include any configured question that may be determined based on multimedia information accessible to the intelligent assistant hub 110.

In block 502, the intelligent assistant hub 110 may then analyze relevant social media images, or other multimedia items, based on the target criteria. For example, if the target criteria indicated a gift for a particular individual, then that individual's images may be analyzed to determine whether that individual may or may not already own the gift. In another example, if the target criteria is based on whether anyone else at a social event will wear the same clothing as the clothing in the picture, the requestor's social friend's images may be searched for corresponding clothing.

In block 504, the results of the search are determined. This may include determining what the likelihood of a match is based on image matching heuristics or other models. The results (text results, or in some embodiments matching images), may then be transmitted back to participant's device 108 for display. The display may indicate the likelihood of an event occurring or not occurring, or a confidence level in the query result.

Other Multimedia Examples

Images, video data, and other data regarding events that are not yet readily available in the expected databases may be used to supplement the data available to the system, such as to determine stored behaviors and/or to determine observed behaviors that the system attempts to match to one or more stored behaviors. For example, a photograph with metadata indicating it is 8 hours old and showing a "street closed for street fair all weekend" sign may be used to supplement road closure data available from Garmin™.

Images, video and other data may also be utilized to identify people who are associated with each other, organizations, or activities (face recognition technology may be utilized among other things). Similarly, expected clothing and appearance elements, such as the presence and type of facial hair, whether all women at a certain location wear burkas, common clothing and head coverings, etc., may be utilized by the system to identify suitable participants and/or to provide information or guidance to participants.

Indeed, video and audio data may additionally be utilized to determine whether potential participants have accents, speak a certain language or dialect thereof, speak slowly or quickly, speak softly or loudly, etc. Similarly, venues may be identified as having good or bad acoustics and having loud or quiet ambient sound (including music or televisions). Such information may be used by the system to identify and/or prepare participants. For example, a person with slight hearing loss meeting with a person with an accent and who speaks softly may be advised to avoid certain venues with high levels of ambient noise. The system may also compare these factors and determine whether assistive devices and/or translators will be required, and if so, what type of devices or translators.

Additional information may be gathered from various data sources and incorporated into the system. For example, how people similar to meeting participants (body type, cultural background, educational background), or the meeting participants themselves, normally sit or participate at meetings. In one example, somebody who fidgets may be preferentially seated near the end of a table, while a person who typically speaks softly but contributes significantly to the process during meetings may be seated toward the center of a table. Cultural analysis may also be done as to how to arrange seating (for example, a person with the habit of crossing their legs in a manner that shows the bottom of their foot to the person on their right may be seated at a place where there is too little room to cross their legs should the meeting also include a participant (or likely include a participant) from a culture where showing the bottom of a foot is considered an insult. Actual table shape, or the expected table shape for a specified location, may be incorporated as an additional factor.

The system may also utilize various data sources, including real time traffic data, 3D models, data from drones, helicopters and other sources. For example, a sensor mounted on a drone may show poor air quality up to 1,000 in the Los Angeles basin. In such a case, a meeting set for downtown may be moved to a venue in the hills above the 1,000 foot line.

Similarly, as another data source, activity on a social networking system may be used as indicia of when a user is utilizing a computer (as may availability on an instant messaging program or when a user sends or receives emails). Such cues (e.g. potential observed behaviors, which may be matched to stored behaviors) may be utilized to determine when a message should be sent via email or when it is unlikely to be read by email so should be sent via another mode, such as SMS. Similarly, cues in the messages (such as email headers or notes in an email such as "sent from a mobile device" and other potential observed behaviors, which may be matched to stored behaviors) may be used to determine when email is likely to be read on a device other than a traditional computer (and optionally, what kind of device and device characteristics). Such information may be used to alter communication patterns with such user.

It should be noted that gathered information or cues, such as observed behaviors or potential observed behaviors, may be used automatically to determine information to be presented as soon as possible (e.g., in realtime) to a user, such as information that may be used in formulating messaging or meeting strategy or identifying undesired behaviors during a meeting, etc. In some embodiments, information to be presented to a user is formulated only when a proposed action or behavior appears to conflict with gathered information or cues, or according to other formulations.

In one embodiment, the system may be integrated into one or more social networking systems, may itself comprise one or more social networking systems, may incorporate data from one or more social networking systems, or any combination thereof.

In one aspect, an automated analysis may be made to determine and/or predict scheduling availability, schedule patterns, travel patterns, or other useful patterns. Among other data points, the system may analyze internet or network activity, email or meeting activity, indicia of real world activity (such as posts by a person or others describing a person's real world activity and/or schedules), and/or data gathered from real world sensors (for example, metadata contained in photographs may be utilized to determine where a person was at a given time and place; though it should be noted that metadata is defined herein to include the data itself where useful information may be gleaned from it such as may be obtained with facial recognition, identifying the person and/or others and/or objects and/or places in the photograph may be identified even if not identified in textual metadata). This analysis of a person's activity may be used for various purposes, including determination of appropriate advice, guidance, or programmatic activity with regard to scheduling and other communications.

The method may further include a communication to the user about the factors that were used to determine meeting or communication parameters. Such information may be useful to the user in determining additional factors, such as the content or nature of the meeting or communication. Such information may further be combined with additional information relevant to the meeting or communication.

When planning any interaction (whether in person, via live telecommunication, via message, or by other means) it may be useful to determine what the likelihood is that a person will show up and/or respond, and if so, what to expect in terms of timeliness. For example, the system may analyze available data to determine the likelihood that a meeting will be cancelled or that one or more participants will not show up. Similarly, it may score the likelihood that an email will be replied to, and if so, the type of reply (length, cursory, or otherwise) and the delay to expect before a reply.

In addition, the system may provide timing windows based on predictions, past performance, and/or cultural factors. If, for example, it is unacceptable to be more than 5 minutes late for a meeting in a particular culture, when scheduling such a meeting, the system may provide additional warnings prior to the meeting or may schedule the meeting at an earlier time. In addition, the system may utilize mobile devices and/or interaction with fixed location devices to determine if the user is at risk of missing a meeting. For example, if a user has a meeting in downtown Los Angeles at 4:00 p.m., the system may determine that the user is at risk if the user is sitting at a computer located in Santa Monica at 3:00 p.m. (location may be determined with geo-ip, GPS, or other mechanisms). Similarly, if the user is in Santa Monica at 3:00 p.m. but is in motion (such as if a user's cellular device GPS indicates the user is heading eastbound on the 10 freeway), the user may not receive a warning unless the user becomes at risk for being late (such as by exiting the freeway and heading toward the beach). In one aspect, the system may automatically (or according to a rule set) notify one or more participants (which may be limited to participants on the "same team" or meeting other criteria) that the user is likely to be late. The system may analyze cultural and/or situational needs to determine where notification is desirable.

In addition, the system may take into account extrinsic information, such as historic or extent traffic conditions, in making determinations. When scheduling events or at other times, the system may warn if events are set with insufficient time to transition between events. Such warning may be triggered by a change to extrinsic information, such as a change to traffic conditions. Where there are cultural and/or situational preferences or norms with regard to early or late arrival, the system may identify a time window and warn the user (or a third party) if the user risks arriving outside of that window. The system may additional utilize GPS data, such as by warning a user who has arrived at the destination that they are more than 10 minutes early, which falls outside of the 5 minute window for early arrival.

Example Outcome Predictions

Figure 7:
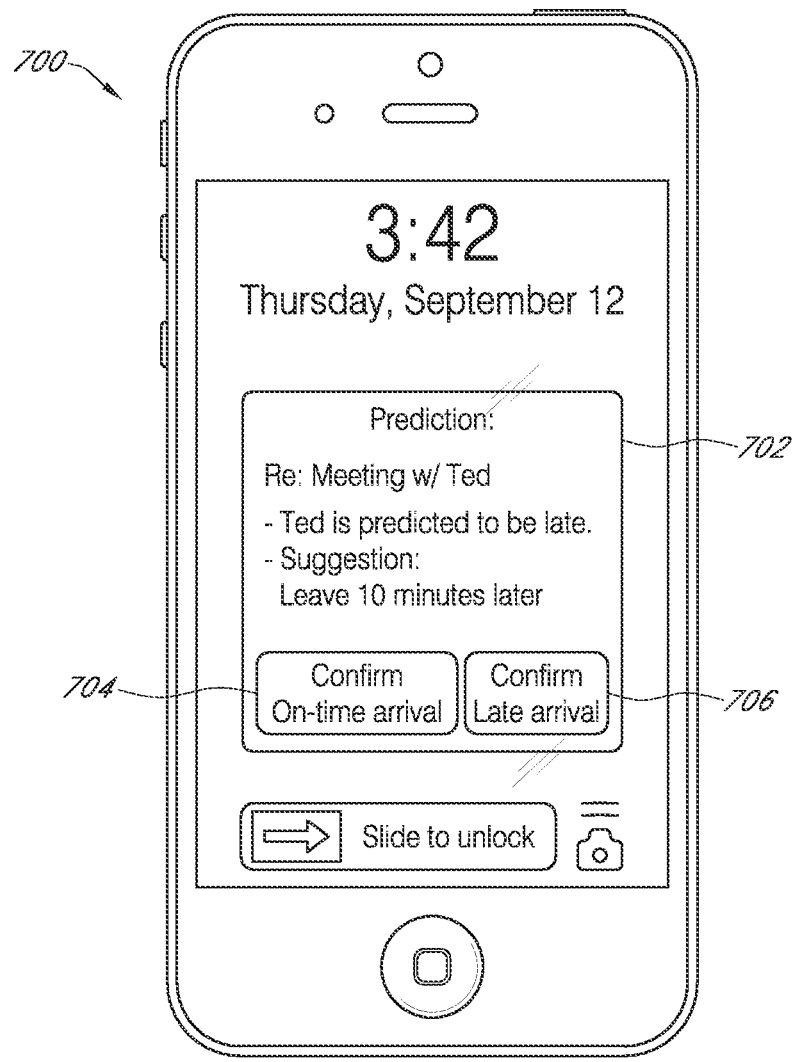
FIG. 7 shows a sample user interface of the system in which a smart prediction is received, according to one embodiment.

It may also be desirable for the system to predict probabilities for particular outcomes. For example, as depicted in FIG. 7 according to one embodiment, based on the traffic conditions described above, predictions may be made based on a user's movements or locations. These predictions may appear as notifications in a user application, such as the one depicted in FIG. 7. This may comprise a mobile application (such as an app on an iPhone). Notification data may be sent from intelligent assistant hub 110 that is tracking traffic conditions and participant movement. Based on these factors, the notification data may indicate to a participant that a user is early or late, and suggest changes in calendaring as a result. For example, app screen 702 describes a user Ted as being predicted to be late to a meeting. The notification also presents an option to a participant to alter their behavior, such as by leaving 10 minutes later. Various user interface buttons may be presented to the easier to act on this information. For example, activating button 704 may confirm to the calendaring system and/or other users that the participant is still planning on arriving on time despite Ted being late. Activating button 706, on the other hand, may indicate to the system that the participant is altering their schedule based on Ted's delay.

For example, a meeting between Hamas representatives and Israeli citizens may be ranked as likely to be unsuccessful unless dealing in one or more particular areas where there has been past success. In one aspect, available data may be utilized to set up a probabilistic model, or any model described above, and/or simulations may then be run to determine the likely range of outcomes.

Example Consideration of Cultural Factors

Further, cultural factors are frequently overlooked in preparing for a meeting, in determining the appropriate content of a meeting or communication, in conduct within a meeting, in tone or other affect within a communication or meeting, or in other interactions. Similarly, cultural and other factors may significantly impact the ability of a person to arrive at a meeting in a timely manner and ready to work.

For example, cultures differ in expectations about personal space and proximity. In some cultures, standing too close to another person is viewed as rude, while in others it is viewed as proper. Standards for dress and appearance vary from culture to culture. Gifts and other tokens of greeting or appreciation may be interpreted very differently from culture to culture—such as where a person presents a rose when the particular flower is considered bad luck in that culture. The appropriateness of incorporating other activities into meetings, such as meals, varies significantly from culture to culture.

Indeed, in certain cultures there is an expectation that one participant will engage in activities that are illegal or highly inappropriate in the nation of another participant. In one example, a company from a country where women are not expected to be vested with decision-making authority may seek to hire a law firm in the United States, where such discrimination based on gender is illegal. Similarly, a businessman from one country may find his hosts from another country insulted when he refuses to socialize at a strip club. Indeed, even within a single nation, regional or religious differences may result in profound misunderstandings, such as where a Mormon businesswoman is invited to a business dinner with a heavy focus on alcohol.

Further, cultural attitudes toward working relationships may be analyzed or utilized. For example, a New Zealand company working with two allies, one from the United States and the other from Japan, would benefit from understanding that statistically, Americans are more likely to prefer a more individualistic working relationship, while Japanese are more likely to prefer a more collectivist working relationship. In one implementation, the system may take or give weight to such preferences in managing communications or meetings. Gender, religious, cultural, and national differences in such areas may be considered.

Where such factors are known to exist, the system would alter meeting parameters and communications content appropriately, and/or would warn the user that it has detected a potential conflict or a cultural, personal, or other nature. Where such factors are not known, the system described herein may make probabilistic assessments as to the likelihood that they exist. For example, a person with a history of travel to Israel and with a significant number of friends who keep kosher may be scored as likely to require kosher food.

Example Notification

Figure 8:
FIG. 8 shows a sample user interface of the system in which a smart warning is received, according to one embodiment.

Individual circumstances may make a meeting or characteristic of a meeting very uncomfortable for a participant. In one example, a vegetarian may find an invitation to dinner at a steakhouse uncomfortable. Similarly, a recovering alcoholic may have difficulty with an invitation to finalize negotiations over drinks. In FIG. 8, a user interface for receiving a warning is presented that may be used to inform the user of important information based on the context of a meeting or message. For example, as discussed above a vegetarian may find an invitation to dinner at a steakhouse uncomfortable. The system may present to the user such a warning automatically. In user interface 802, the system may present options for handling the warning. For example, the user interface may present button 804 that, if activated, may allow the user to suggest a new restaurant for the meeting (manually, or automatically based on their context aware preferences). Alternatively, the warning may be ignored with button 806.

Example Information Sharing

In one implementation, multiple implementations of the system (or even with regard to different users within the same system) may make information available to trusted users. In such an implementation, User 1 may seek to set up a meeting with User 2. Optionally after seeking validation from User 2, or after checking to see if the users are "friends" or otherwise linked within a social network context, work for "precleared" companies, or other factors, the system (or systems after an exchange of data) would utilize self-reported factors from each user to create an appropriate communication or meeting.

In one aspect, the system may craft meeting parameters by exchanging proposed meeting times, places, or other elements from one user to the other, and having the system automatically reject meetings with parameters that conflict with user preferences, cultural or otherwise. Such rejection may be accompanied by an invitation to suggest another time or other parameters, or by a suggestion of another time or other parameters. In addition, or alternatively, the system may initially pick a meeting time or parameter that complies with known facts and/or probabilistically likely facts about the other user.

In one aspect, the health and vaccination history of the user may be compared to the situation and risks in the place of the meeting (and in places visited in transit to the meeting), and alternate meeting places or times suggested. In addition, the system may provide a list of necessary health measures, such as shots or preventative pills or bringing antibiotics, that may be desirable. The system may also use the amount of medical preparation and risk as factors in weighting whether a place is appropriate for a meeting and/or in determining which of a plurality of locations and/or times is desirable.

Example Pre-Meeting Tips

Once a meeting has been set (or in conjunction with other communications or in conjunction with negotiating the meeting), the system may provide cultural and behavioral guidelines based on information about participants. For example, in preparation for a meeting with people from a nation where showing the bottom of a person's foot is considered an insult, such information may warn against doing so. In one implementation, the guidelines may be presented in order of importance or significance, and/or may include an explanation of such guideline and/or a score as to the relative significance of such guideline. Such guideline may, in one implementation, be presented as a "tips" application or sheet.

While the "tips" app or sheet may be presented electronically, on paper, or via any other mode of communication, and while the specific factors that are significant enough to include will vary based upon the needs of the individual and their industry, it may include some or all of the factors depicted in FIGS. 11A, 11B, and 11C. In one embodiment, such a sheet or "checklist" may aggregate all of the data needed for a meeting. In another, different lists may be provided for different portions of the meeting or different participants.

Example "Tips" Application

Figure 9:
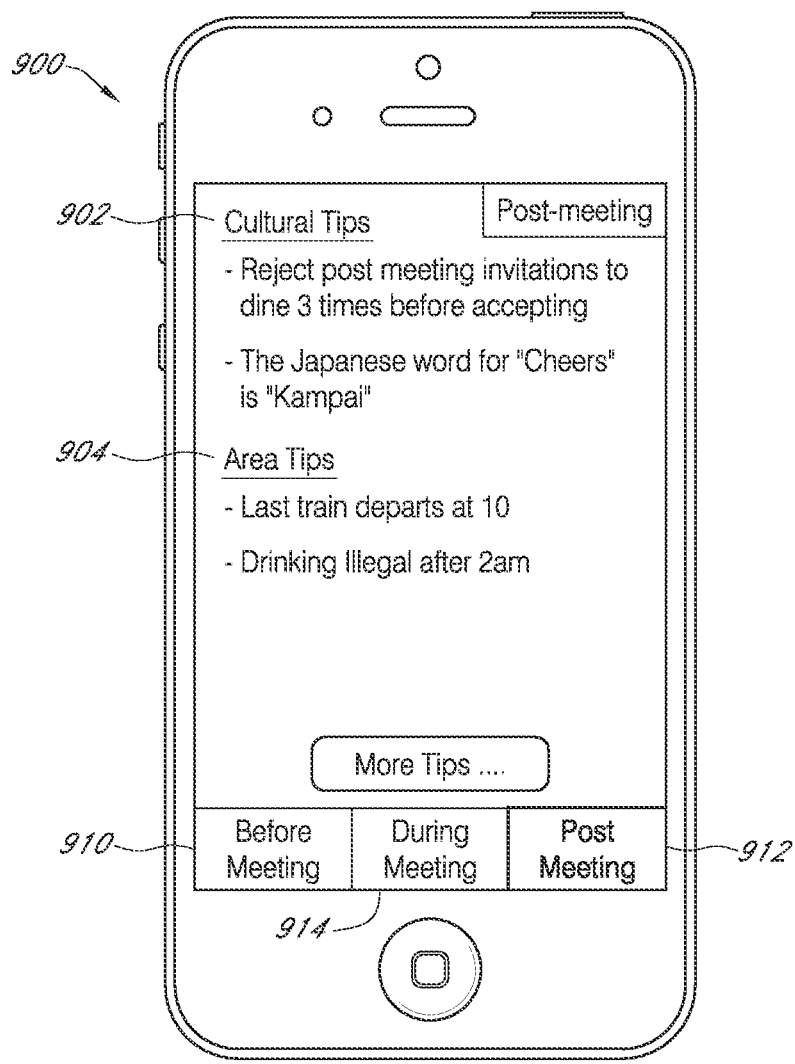
FIG. 9 shows a sample user interface of the system in which tips are recommended, according to one embodiment.

FIG. 9 illustrates one example of an electronic context aware tips mobile device user interface, according to one embodiment. Interface 900 may present, for example, context aware tips to be used before, during, and/or after a meeting. The Before Meeting button 910 may display tips relevant for before the meeting, such as items that require some time to perform prior to the meeting. Selecting During Meeting button 914 may display the tips for during the meeting, and Post Meeting button 912 may display tips for after the meeting. In some embodiments, buttons are not required and the appropriate tips are displayed automatically based on the system being aware of what stage the meeting is in (e.g., by using time to determine whether the meeting is schedule, active, or over).

The system may provide a wide variety of tips, including all of those listed in FIG. 11. In this example, cultural tips 902 are presented. For instance, in some cultures a gift or invitation must be refused prior to acceptance. This information may be determined to be relevant based on the context (e.g., based on participant tracking, it is known that participants frequently go out to dinner after a meeting), and may be displayed to the user in case any invitation is extended post meeting. Location or area based context aware tips may be provided 904.

Example Travel Tips and Information

Figure 6:
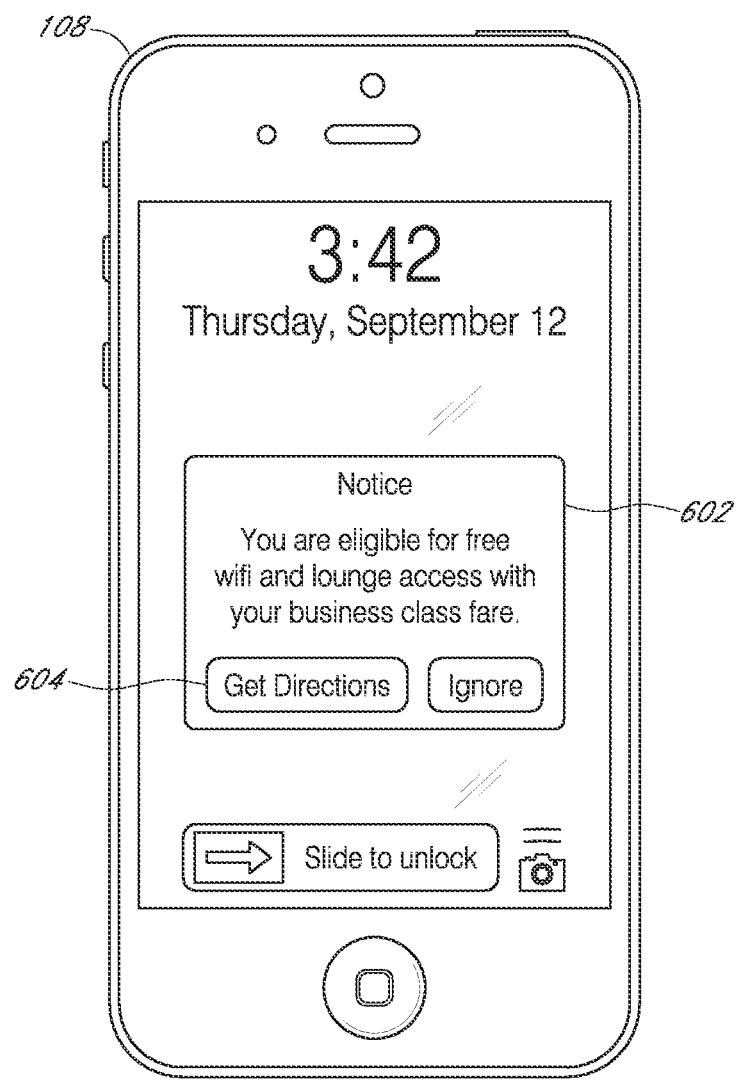
FIG. 6 shows a sample user interface of the system in which a smart notice is received, according to one embodiment.

In one embodiment, a database of global guidance and travel is accessed by a portable device. The device incorporates some or all of real-time data, such as weather and traffic conditions and exchange rates with other data (real-time or otherwise), such as expected behavior, food, legal, and safety information. In one implementation, the database is updated in realtime utilizing GPS or other geolocation mechanisms. In a further implementation, where guidance is unclear (such as guidance as to language spoken when travelling near the border between the United States and Mexico), the one or more recommendations are presented and/or the best recommendation is presented and/or such recommendations are accompanied by scoring data, which data may be presented numerically or graphically (such as by color or intensity of the text display). In another implementation, current location data may be incorporated with calendaring information to provide recommendations, such as where a person is in Los Angeles but scheduled to fly to New York, where the system may include both warm and cold clothing on such list. In one embodiment, the system relies only upon schedule data and/or manually input data. In one embodiment, the system obtains schedule data from other sources, such as social network posts and emails. In one embodiment, the data is displayed as an "app" on a mobile device, which "app" may serve as the entire system, or may send some or all of the data to another system for analysis or use. In one embodiment, the system may also present (either as a "pop-up" from a background application, on demand, or otherwise) information useful to the traveler based on highly local data. For example, as depicted in FIG. 6, a traveler newly arrived in an airport from an international destination may be presented with a pop-up alert saying "If you are on a Y fare or higher, you are eligible for free use of the lounge", or an alert 602 noting "You are eligible for free Wi-Fi and lounge with your business class fare" along with options 604 to be given directions to the lounge if required.

In addition, where elite or other travel memberships or status provide access, the system may direct users to such access (for example, first class lines or elite travel program security clearance). Where cellular phones or other mobile devices are utilized as payment systems, the database may be consulted (or a default value used) to determine a culturally or otherwise appropriate transaction parameter, such as a tip amount. Such parameter may be used to determine when the user is making a possible error (for example, "you are tipping 20%; traditional tipping here is 5%") and/or to directly input the data (for example, by automatically calculating the tip based on cultural expectations). Where individualized data (such as quality of service) as a factor in determining the parameter (such as a tip), the system may accept a rating (such as "rank the service from 1, excellent, to 5, terrible") and calculate an appropriate tip based on consideration of the individualized data in light of localized data for such parameter.

The system may also track travel documentation and restrictions. For example, if a person may only travel where dialysis is available, an attempt to travel to a nation where his insurance will not be honored, or where no dialysis is available, may be rejected or may result in a warning. Similarly, notification of the need for travel documents, such as a visa, may be made. Where the system has data about the user's extent travel documents, the system may automatically determine if the travel documents are adequate (for example, warning if a travel document will expire prior to the travel date). In addition, the system may track, plan about, and/or warn about acceptable payment systems. For example, if the user has only a Visa card and a Cirrus network ATM card, and is about to travel into a nation with a low level of Visa card acceptance and no Cirrus network ATMs will be near his planned travel route or destination, the user may be warned. In another variant, the user may be notified when he passes or nears the last facility for using a particular payment system and is not expected to be near another one for a set period of time (i.e. if the last compatible ATM machine is in the airport and the user is about to take a cab into the city, where no additional compatible ATM machines are found). Data about the relative comfort of various travel modalities may also be incorporated, such as by using data about in-flight humidity, seat pitch, or similar factors. Such factors may be further weighted by user characteristics, such as by reducing the weight attached to seat pitch for a very short user.

Example Environmental Sensors and Notification Devices

In one embodiment, such guidelines may be programmed into a computing system coupled to one or more environmental data gathering devices, such as a camera or microphone. In one aspect, one or more users may be provided with a display or communication device coupled to such computing system. The display or communication device may, but need not, be physically attached or virtually attached (such as by Bluetooth) to the environmental data gathering devices, although for near-real time operation of this embodiment, some form of connection is preferable. The display or communication device, the environmental sensors, and the computing system may all be incorporated into a single device, connected through a network, connected through a local connection, wired or wireless, or otherwise set to communication with each other whether in real time or with stored data. In the near real time implementation, the environmental sensors feed data to the computing device, the data is analyzed to determine what cultural or other guidelines are being violated or complied with, or appear close to being violated or complied with, and the user provided with such feedback via the display or communication device. In one implementation, such data is provided in order of importance. In another, only data of a set level of significance or higher is provided. In another, the required level of significance may be changed by the user, or, when the system determines (such as by analysis of voice tone or body language) that the meetings is not proceeding as expected or that there is a likelihood that some disruptive event likely related to compliance with cultural or other norms has occurred or is occurring.

Figure 10:
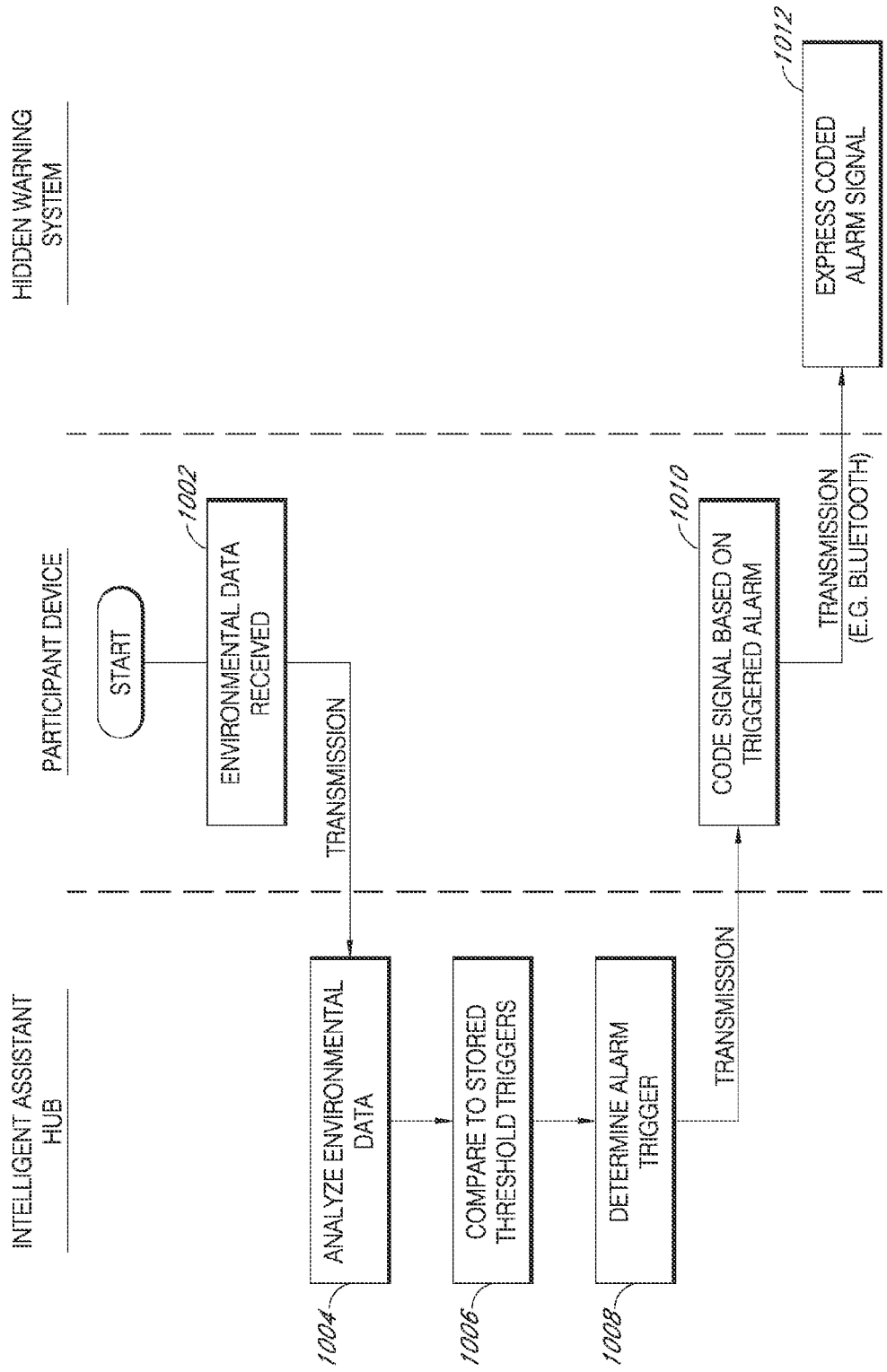
FIG. 10 shows a flowchart depicting illustrative environmental sensing and reporting operations of the system, according to an embodiment of the present disclosure.

For example, according to one embodiment, as illustrated in FIG. 10, a warning system minimally perceptible to other meeting participants, such as a vibrating watch, may be used to inform the user that the system has detected an issue. Additional information may be made available by the same device or another display or communications device. In one embodiment, a hidden warning system that is minimally perceptible to other participants may be used where a number of specific behaviors are tied to a certain warning pattern, for example a single buzz indicating that the user is standing too close to another participant, a dual buzz to indicate that the user is showing the bottom of his foot, a triple buzz to indicate that the user is using an incorrect form of address, such as "Mr." when the correct term is "Your Honor", and a quadruple buzz to indicate some other issue has been detected. In one aspect, when another issue has been detected, additional information may be made available on a display system. The display system may include a heads-up display in eyeglasses, an audio display such as an earpiece, a Braille or similar tactile display, a display on a computer, phone or tablet device, or a coded display whether via one of those modalities or another modality. In one implementation, the display is polarized in a manner that obscures the message unless the user is wearing glasses capable or interacting with the polarized light in a set manner. In another implementation, the display is shown only when the environmental sensors show that other participants (or certain other participants) are not looking in a direction that would allow them to read the message. In another aspect, the system may provide real time translation. In one aspect, real time translation would be provided only for words, terms, or phrases more complex than a set grade level. In another aspect, translation may be provided only where the speaker talks in a manner more likely to be difficult to understand (such as where there is a heavy regional dialect). In another aspect, the system would track the alcohol intake of one or more participants (including the user), optionally considering actual or estimated weight of the participant, optionally considering the gender of the participant, optionally considering the estimated metabolization rate for each participant, and make available to one or more participants or other persons real time or non-real time data on likely blood alcohol level and level of impairment of the one or more participants. In one implementation a warning may be issued where the level exceeds a certain point. Additional data, such as nystagmus or lack of coordination, may also be noted, utilized, or incorporated.

Such a warning system (which is not restricted to a watch, but may be in the form of any hidden messaging), is illustrated in FIG. 10, according to one embodiment. In block 1002, the participant device 108 may receive environmental data using an environmental sensor. For example, data may be received by camera, thermometer, gyro sensor, light meter, microphone, etc. The data is then transmitted to the Intelligent Assistant Hub 110 for analysis (if not being processed locally). In blocks 1004 and 1006, the environmental data is analyzed according to FIG. 3, for example. If an observed behavior is detected, an alarm may be triggered in 1008. For example, if it is detected that the participant is standing too close to another person, that detected observed behavior (or a message to step away, etc.) may be transmitted to participant device 108.

In block 1010, the participant device 108 may code an alarm signal to be transmitted to the hidden messaging device. For example, a watch may be programmed to buzz based on Bluetooth signals received from a participant device 108 such as a mobile phone. The mobile phone would configure the Bluetooth (or other wireless protocol) transmission to instruct the watch to emit the correct number of buzzes, or any other type of hidden signal, that corresponds to the observed behavior/recommendation. In block 1012, when the watch receives the signal instruction, the signal will be expressed to the participant and understood by the user without notifying other parties. Similarly, the hidden message may be provided via other devices, such as smart glasses (e.g., Google Glass) in order to provide a textual description of the observed behavior to the user (e.g., "You're standing too close—move back one step)".

Example Business Predictions

In another aspect, the system may gather data about companies involved in a proposed communication, meeting or transaction, and utilize that data. In one aspect, the system may analyze data, such as public records data, to determine the frequency with which persons bearing certain characteristics have or succeeded at (or failed to succeed at), rising within a company, dealing with a company, entering into a profitable arrangement within a company, or otherwise productively dealing with the company. The nature of meetings or communications leading to such outcomes (or failing to lead to such outcomes) may similarly be analyzed. It should be understood that such analysis may also be done for individuals or groups of individuals as well as for companies. Data that leads to indirect inferences (such as data about shareholders) may be utilized as well.

For example, an analysis of public records may show that ExampleCo, a Florida corporation, has a fifteen member Board of Directors, twelve from the Southern states and three from Nevada. In such a case, a corporation trying to do business with ExampleCo might preferentially select to make contact through an agent with a Southern background or, failing that, an agent from Nevada. By contrast, if all members of ExampleTwoCo's board were from Japan, it would be scored as unlikely that approaching that company other than through a local Japanese agent would be successful. In certain cases, the system may (upon request or automatically) suggest similarly situated companies with a profile that makes a deal more likely (such as a company with a Board that is more diverse, or more similar to the user's company's board or the user's characteristics).

For further example, consider that ExampleCo may be a publicly traded U.S. corporation. An analysis of SEC filings may indicate that of the last 100 times ExampleCo filed a Form 8-K, 40% involved a deal with a company in China, 20% involved deals with a company in the United States, and the remaining 40% related to scattered events, none of which involved European markets. In such a case, a Dutch company looking to market ExampleCo's products in Europe may have an opportunity, but communications would need to be filtered through the lens of ExampleCo's experience. The system would account for such a need, for example, by giving additional weight to conflicts between Chinese and U.S. customs, on the one hand, and Dutch customs, on the other. In such an example, while behaviors that are normally discouraged in the United States but acceptable in China may be scored as less important to avoid than would be behaviors that are normally discouraged in both nations—even if the meeting is taking place in the United States and with only U.S. participants. In this case, because ExampleCo's agents are inferred to be used to dealing with Chinese companies, an inference may be made that engaging in a behavior that is normal during Chinese business meetings is less likely to be troublesome for ExampleCo than it would be for a company within a similar level of experience in China. In one aspect, such a weighting system may be additionally refined by looking to the personal experiences of the proposed meeting participants.

In a further aspect, elements common to deals with a target entity may be identified by the system and meetings or communications shaped to recreate or emulate some or all such elements. For example, if 80% of all of ExampleCo's recent press releases about big deals contained the term "significant European presence", it may be inferred that an approach to ExampleCo utilizing that term (or a similar term) may be preferable. In one implementation, similar terms may be automatically altered to make them more similar or even identical, such as by altering "big EU footprint" to "significant European footprint". Such alterations may also be made as suggestions to the user, optionally with an explanation and/or weighting providing to the user. In addition to press releases, other communications by or about a target company or person may be used. Language that is common to documents, web pages, and/or communications written by such target may also be automatically inserted into communications (or such insertion suggested to the user). If, for example, ExampleCo frequently uses the term "disruptive to the industry", communications containing analogous or somewhat analogous phrases, such as "industry altering" may be changed to "disruptive to the industry". Such changes may be made only where such change would not cause the phrase to appear within a selected proximity of the same phrase in the same document.

In should be understood that among other things, when the system gathers data about individuals (or groups, cultures, and nations), such data may include: customs, race, religion, beliefs, values, assumptions, attitude, family, generations, history, disease, geography, age, creed, color, rituals, height, weight, leisure, disabilities, genetics, arts, sex, ecosystems, modality, size, birthrate, language, accent, dialect, strength, adaptability, and life expectancy. When the system considers communications, meetings, and physical environments for meetings, additional factors may include whether the meeting is to take place on land, water, or in flight; traffic data, both real time and predicted; time zones; plants, including whether allergens, particularly where a participant is known to have allergies; geology, seasons, currents, amount and timing of sunlight; phase of the moon; wildlife, temperature; disease and epidemics and similar factors. The system may also consider business practices; supply chain issues; manufacturing capacity and expertise; financial issues; healthcare infrastructure; tools, models; fashion; housing; patents and patent system; trademark and trademark system; copyright and copyright system; research and development; food, education, energy, and similar factors.

Other Example Data Sources and Predictions

Terrorist watch lists, lists of nations with which commerce is banned, and similar datasets would also be utilized in one implementation. For individuals or groups involved in certain industries, additional calendars or data may be checked. For example, a COO might be scored as less likely to be available just prior to the end of the fiscal year, a CPA might be scored as less likely to be available just prior to the end of the tax year, and an attorney's availability may be scored by checking court calendars for trial or hearing dates.

In another aspect, safety and security assessments may be utilized. In one implementation, generalized crime data may be utilized. In addition, or instead of, such generalized data, more sophisticated measures may be utilized, such as analyzing crime data by demographics (i.e. the number of people with similar demographics to the user who were victims), by date (for example, Mardi Gras may correspond to higher crime rates), by location, or by a combination thereof. Alterations may be made or suggested to travel plans, and/or advice given as to how to behave and/or appear, that mitigates such risk. Furthermore, measures of national, regional, and/or ethnic discrimination or otherwise disparate treatment may be utilized. For example, a Sunni Muslim visitor to a Shiite Muslim area may trigger additional risk scoring and/or changes to travel recommendations. In one implementation, communications by email or other electronic means may automatically be altered to reflect a name and profile that are more likely to obtain good results, whether by avoiding bias or otherwise. For example, if a woman named "Jane Smith" is communicating with a party who is likely to discriminate against women, the system may automatically alter her communications to reflect the name "John Smith". Another response may be for the system to create, either automatically, with human approval and/or input, or with a combination thereof, a fictitious additional persona for the user. Such persona may additionally minimize risk of discrimination, as by having "Jane Smith" automatically communicate via an artificial persona such as "John Washington". Where communications include voice and/or video, automated (in one implementation, real-time) alterations to the voice and/or appearance and/or mannerisms, and/or accents of one or more participants may be made. Such alterations may be made to make the artificial persona appear to be the one communicating. Such alterations may also be made to influence the likelihood that the communications will be received in a particular manner or understood or accepted. For example, a telecommunications device may alter a Boston accent to sound like a mid-west accent where it is determined or believed that such a change may be advantageous.

The system may also determine the reputation of the people and companies represented at (or present at, or proposed to be present at) a meeting. In one aspect, public data such as internet data reporting "scams" by companies may be utilized. An appropriate warning may be issued. In addition, where there is a risk (such as a company whose public records show a high level of litigation over contracts), additional participants (such as legal counsel) may be added or recommended.

In one aspect, the system may identify additional participants or communications recipients (either automatically or upon request). For example, if a meeting is being conducted with ExampleCo about bringing widgets to Europe, and a common contact for both parties is Jane Smith who has written a book about widgets, the system may suggest (or automatically include) Jane Smith.

In one aspect, records of charitable, political, and other giving may be utilized to generate data about political or charitable interests or preferences for people.

In one aspect, the system may utilize the available data to generate a scoring of likelihood of conflict, success, or other outcomes. For example, if a meeting is being set up between a businessman who is associated with Hamas and a businessman who regularly donated money only to Jewish politicians, even in the absence of any specific factors standing in the way of a meeting, the system may score the meeting as unlikely to succeed and provide the user with such information. Similarly, if a meeting to discuss sales of printer paper was being set up between ExampleCo and a Joe Smith of ExampleTwoCo, and public records show that Joe Smith has given the maximum amount legally possible to every Republican presidential candidate for the past 5 election cycles, as between ExampleCo's two possible representatives at the meeting— representatives who are otherwise equally well suited to the meeting but who differ in political orientation—the system would recommend, assign, and/or attach additional weight to the representative who was Republican. The significance attached to political differences, differences in hobbies, and similar differences that are colloquially seen as more likely to influence a friendship than a business relationship, may be increased when the meeting is between people from cultures where socialization is an expected or important part of a business deal. In cultures where participants "get right down to business", the weighting of political or similar disagreements, or lack of common interests, would be reduced.

Example Conference Call Improvements

Another aspect of the invention addresses several long felt needs in the field, including the ability to hold meetings at factories, shipyards, clubs, and other locations where there is a significant amount of noise, as well as the ability to hold meetings where participants are free to leave the immediate area, such as to inspect an item being discussed, without leaving the conversation. Existing conference call technology as well as blue tooth ear piece technology is well known, but falls short in this regard. There is an unsettling delay in between hearing a live voice and hearing the voice as transmitted over a conference call. Thus, it is not desirable to hold a meeting where participants all have earpieces connected via a conference call so that ambient noise can be overcome or so that participants can move around during the meeting. In one embodiment, the system provides a method of communication whereby a plurality of participants have equipment capable of receiving transmissions from other units, sending transmissions to other units, and determining whether the proximity of the transmitting unit is such that the user is able to hear the participant with the transmitting unit without receiving and playing that transmission for the participant with the receiving unit. For example, imagine that Abe, Belle, and Carl are having a meeting at a factory. Abe is known to have some hearing loss and has set his unit up to play sounds transmitted from other units when the ambient voice of the person wearing the other unit has more than a set likelihood of being incomprehensible to him (or he can actuate the unit manually). Belle walks ten yards away during a conversation. Abe's unit and Carl's unit detect her distance (whether by reading a GPS signal or location signal sent by the unit, reading the strength of the unit's signal, or measuring the sound and qualities of her voice, potentially in combination with measurement of ambient noise levels). Carl's unit determines that Carl can hear Belle without assistance, and does not re transmit what Belle is saying. Abe's unit determines that Abe needs assistance and plays what Belle is saying in Abe's ear. In a variation, the unit may record and/or retain and/or transcribe part or all of the conversation from one or more participants. In one use of such a variation, a participant may indicate to the unit that he or she did not understand what another participant said, in which case the unit may replay the sound for the user, may show a transcript of the sound, may alert the speaker of the problem, or may take similar measures.

Time Synchronization Management

Disclosed herein are various systems and methods of providing the current time zone and/or corresponding current time of a user's various contacts, such as to assistant the user in deciding whether to call the contact, as well as other information regarding the current location of the contact. For example, many individuals in today's world travel extensively and, accordingly, are in and out of various time zones frequently. Even those that only travel periodically, such as once every few months, typically desire to not have their lines of communication with coworkers, family, clients, etc., hampered by difficulties of such contacts in determining the appropriate time and device through which the user may best be contacted at any given time. As another example, if a user wishes to call a contact (perhaps a new contact), the contact's current time may not be readily available. For example, if a user wishes to call or send a message to a particular contact, knowing that the current time where the contact is located is 10:02 PM (e.g., three hours later that the time zone of the user), might help the user to speed up replying to reduce the chance that the contact goes to bed before receiving the call or other communication from the user. With the rise of the mobile phone (even replacing home phones for many individuals) and no/low-additional-cost nationwide and/or worldwide calling, the area code tied to a phone is not necessarily indicative of the location in which the person is living or currently traveling. With the use of universal phone numbers, such as Google Voice, and phones that allow dual (or more) phone number to be associated with a particular phone (e.g., one number for each of multiple countries frequently visited), the area code becomes even less conclusive in determining a contact's location.

Accordingly, disclosed herein is a global call synchronization system, which may be implemented in some embodiments by the intelligent assistant hub 110 of FIG. 1, in conjunction with application software (standalone or plug-in software) executing on the users computing device, such as a cell phone app, a CRM program, or a plug-in to another application, such as an email application. In another embodiment, the call synchronization system may be decentralized, such that it operates by communication between specific user devices (e.g. a user device and one or more contact devices), rather than communicating through a central coordinating server. In other embodiments, the global synchronization system may operate via a combination of direct communications between the user devices and communications via a server.

The global synchronization system discussed herein enables a user to know where various contacts are in the world prior to connecting to them, and then to connect with an individual or a group in the best form possible. This technology, may be applied to a cell phone or a CRM application, such that the user would know immediately what time it is where the person using the phone (referred to generally as a "contact" herein) has registered their phone. Unconsciously and consciously the first thing we do after deciding to make a phone call is to think about the time of the call for the contact ("Will I wake the person?", "Is it lunch time?", "Are they at work?"). Imagine living in San Diego and travelling to London and Italy frequently. Few know about your travels so you're getting calls all night. The global synchronization system may warn the user's that are about to call you about your time zone, current time where you are located, and/or other information about your location, in order to reduce unwanted calls.

Figure 12:
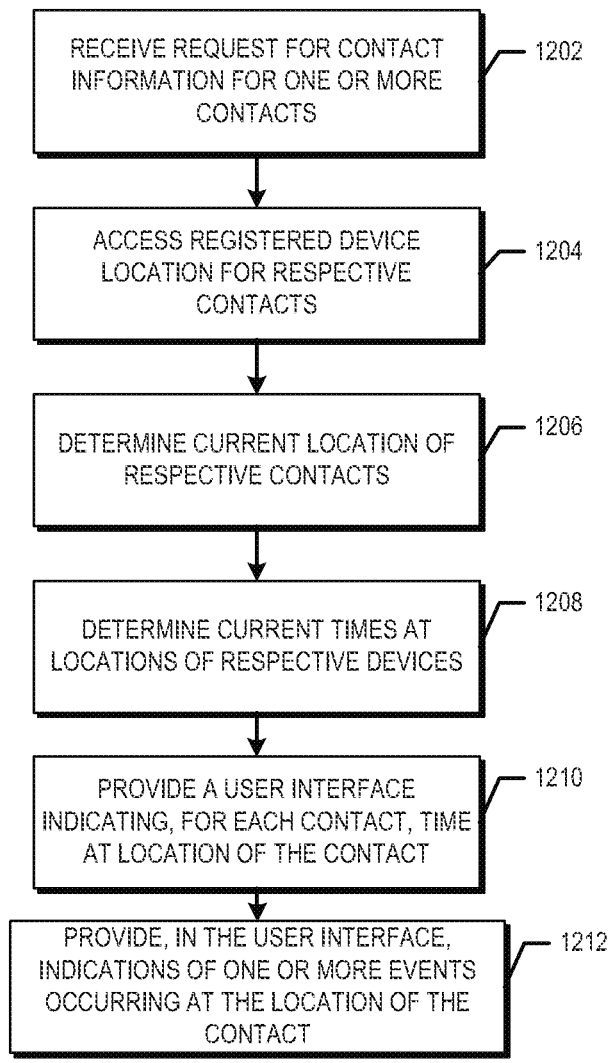
FIG. 12 is a flowchart illustrating one embodiment of a method that may be performed to allow a user to view current time (and other) information for each of a plurality (or just a single) contacts, such as in a contact list in the users cell phone, CRM, or other software application.

FIG. 12 is a flowchart illustrating one embodiment of a method that may be performed to allow a user to view current time (and other) information for each of a plurality (or just a single) contacts, such as in a contact list in the users cell phone, CRM, or other software application. The global synchronization system allows the user to see a current time at the location of each contact, so that the user can make an appropriate decision regarding whether to call (or contact in some other manner) a contact based on the current time where the contact is located. Depending on the embodiment, the method of FIG. 12 may include fewer or additional blocks and/or the blocks may be performed in an order different than is illustrated.

Beginning in block 1202, the global synchronization system receives a request for contact information for one or more contacts. As noted in the examples of FIGS. 12-15 below, this request may come via a mobile application, such as accessing a contact list on a cell phone, or viewing a contact on a CRM system.

Moving to block 1204, the global synchronization system accesses registered device locations for respective contacts. The registered device location may be a home, residence, or work location associated with a particular device, such as a location that may have been provided by the contact upon initial registration or setup of the mobile device. In one embodiment such registered device information is used if more recent geolocation information regarding the current location of the device cannot be identified (see block 1206 below)

At block 1206, the global synchronization system determines the current location of respective contacts, such as based on information received from the various contact devices. For example, software executing on a user's mobile device may transmit a request to a global synchronization system server for information regarding any contacts displayed in a contact list (e.g., FIG. 13). The global synchronization system server may then return such information so that it may be displayed alongside the various contact information and/or used in determining alerts and/or limitations on contacting various individuals.

Next, at block 1208, current times at the determined locations may be determined. For example, a location for a particular contact may be looked up in a location to time zone translation table in order to determine a time zone associated with the current contacts device location. That time zone may then be used to look up the current time at that location. As discussed further below, in one embodiment individual contacts may provide preferred contact times, such that one individual may be shown as within an acceptable call time period at 9 PM, while another individual may be shown as within a non-acceptable call time period at 9 PM. Thus, each contact has the ability to set their own time preferences (e.g., acceptable and non-acceptable call time periods, and/or similar acceptable and non-acceptable time periods for other communications, such as text messaging, email, etc.), such as based on suggested time preferences. Allowing each contact to provide their own acceptable and non-acceptable call time periods allows the system to work with even those individuals that have non-customary contact hours. For example, there are many people in Asia and Asia Pacific who work on US time (e.g., to secure US business) even though they live on the other side of the world. They close their blinds during the day and sleep. Thus, even though it's 1:00 AM for such contacts in Asia (and in a perfect world they'd be sleeping), such contacts likely want others to know that they are available at the time. Similarly, certain contacts (even contacts local to the user) work night, morning, or other shifts that are outside of the normal 9 am-6 pm business calling time that many user's may adhere to.

In one embodiment, a contact may use a "temporarily unavailable" function during their acceptable calling time period to indicate that they can't be notified temporarily (and the color coding of that contact may indicate that the contact is unavailable, such as by the contacts page turning red on the user's device). For example, a surgeon going into surgery, a lawyer going into an M&A deal negotiation, an employee being watched by his supervisor, a student going into a test, etc., are example of contacts that may want to initiate a temporarily unavailable status, which may be configured to change back to the normal status (e.g., acceptable call time period) after a user defined period (e.g., the surgeon may select 2 hours as his unavailable time period based on expected time that he will be in surgery) and/or when the user indicates to the system that the temporary unavailability is over.

Depending on embodiment, the various contacts may provide authorization for the global synchronization system to access geolocation data from one or more devices of the contact. For example, an application on the contacts mobile phone may be configured to provide invitations/authorizations for other users to access the current location of the mobile phone.

At block 1210, the global synchronization system provides one or more user interfaces indicating, for each contact, a time at the location of the contact, such as based on a determined time zone of one or more devices associated with the contact. In one embodiment, a confidence scoring is provided for a particular current time/time zone indication for a contact, which may be based on the amount of information associated with a contact that indicates the contact is within the provided time zone and/or information indicating that the contact is outside of the provided time zone. For example, if one device of the contact is determined to be within time zone A, while another device of the contact is determined to be within time zone B, the global synchronization system may provide some indication that it has a lower confidence that the contact is within either time zone A or B. However, if time zones A and B are near one another, such information may still be valuable to the user as the times zones A and B may have overlapping acceptable and nonacceptable call time periods for most of the time.

In one embodiment, if location information associated with the contact is below a particular confidence level, a registered device location (e.g., home location of the user) may be used to determine a current time associated with the user. In some embodiments, the confidence level associated with provided current times for respective contacts may be indicated in the user interface. For example, the location, color, font size, etc., of the provided time and/or contact information may be adjusted to indicate a confidence level that the contact is actually within a time zone associated with the provided time.

At block 1212, the global synchronization system optionally provides, in one or more user interfaces, indications of one or more events occurring at the location of the contact. As noted below with reference to FIG. 14, for example, information regarding holidays, sporting events, political events, natural disasters, weather, etc., or anything else that may be interesting to the user, may be provided in association with the provided contact information.

The system may be useful in other scenarios, such as for people with distributed offices. As another example, with Arizona's atypical daylight savings time zone adjustments (at least compared to other US states), determining the current time in Arizona from outside of the state can be confusing. Similarly, there are countries in which time zones don't change or have larger geographical time zone areas, e.g., China has only one time zone. As disclosed herein, the global synchronization system takes the guessing and/or manual work to look up the current time at each contact's location, such that the user is able to view current time for each of a plurality of contacts by simply accessing a contact (on a mobile device, desktop device, etc.). This functionality becomes even more valuable if the user is interested in a conference call that includes multiple contacts at different locations. In one embodiment, the various user interfaces (e.g., FIG. 13-14) may filter contacts based on whether they are within an acceptable call time period, such as in response to the user selecting such a filter or setting a default preference to only display contacts that are currently within an acceptable call time period. Thus, the user can quickly scan through a contact list to see only those contacts that are currently available to be contacted in order to make a determination as to whether the conference call should take place immediately or needs to be scheduled for the future (e.g., if one or more key call participants are not within the acceptable call time period). The features of the global synchronization system may be used in conjunction with the above-discussed calendaring and other applications, as well as the discussed call planning features, to pick a later acceptable call time based on expected times/locations of contacts at later times, for example.

As another example, assume a company has offices in 4 different countries. Keeping track of which office each individual is in and the time at those offices is challenging, even more so when DST kicks in. Imagine a traveler that has 47 offices around the world in his business, headquartered in Seattle. While in Seattle he can call the offices without looking anything up because he has learned relative time differences between his home location and other locales over the years. However, when travelling things become more difficult very quickly. The problem is exacerbated when other members of his team are traveling also. For example, even though he's calling a team member in Berlin, the team member may be traveling in London, with the call being forwarded directly to the team member. Using the various features discussed herein, this traveler may see current time information (as well as possibly other information) regarding his team members.

Figure 13:
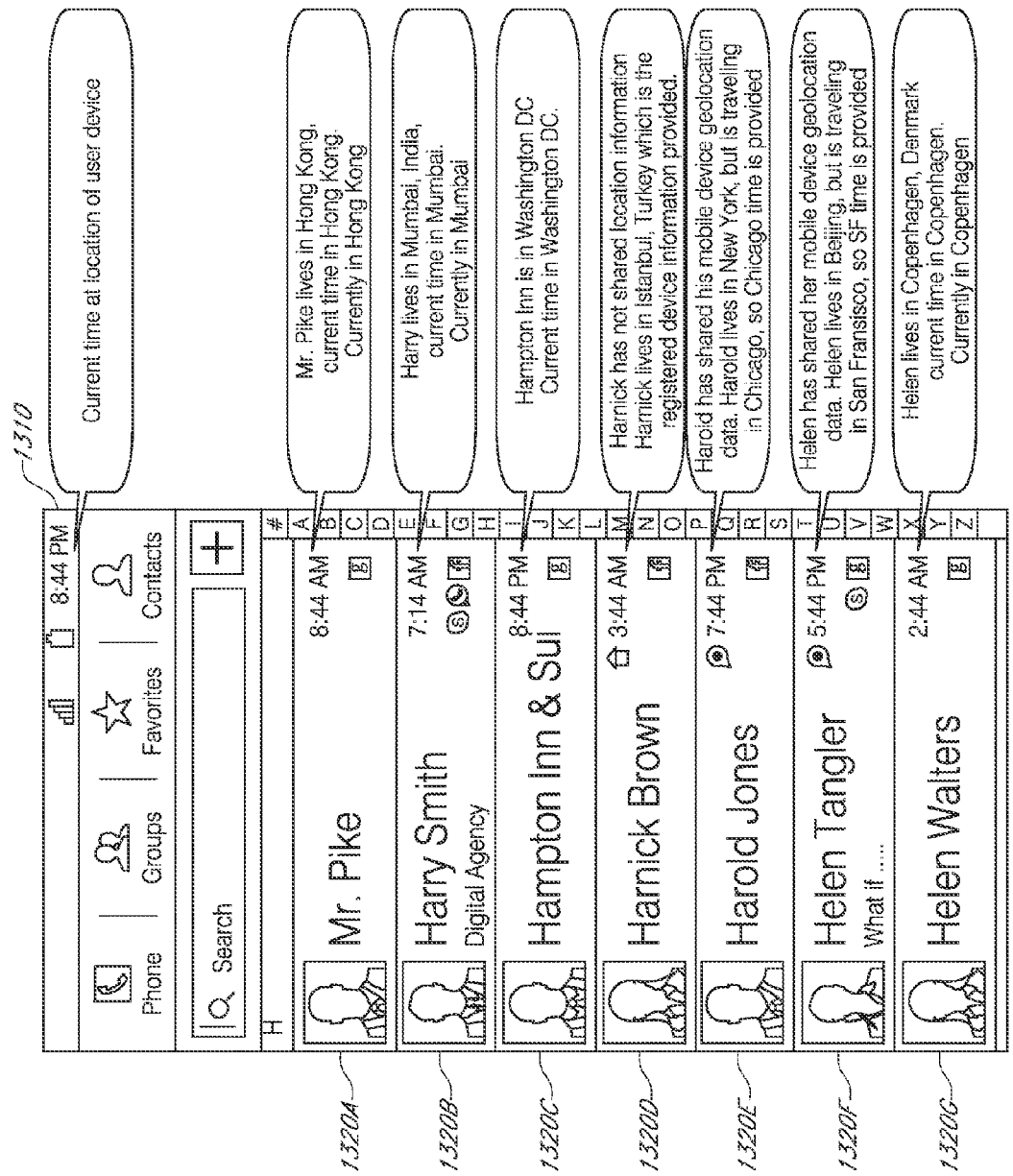
FIG. 13 illustrates one example implementation of a global synchronization system in conjunction with a contact list on a user's mobile device.

FIG. 13 illustrates one example implementation of a global synchronization system in conjunction with a contact list on a user's mobile device. In the example of FIG. 13, the user's current time 1310 is displayed in the upper right-hand corner, which in this example is 8:44 PM. A partial contact list is displayed on the user's device, such as in response to the user selecting a particular group of users, keywords, or navigating through an alphabetical list of users. Advantageously, each of the contacts 1320 (including contact 1320A-1320G) includes a time that is indicative of the current time at the location of that particular contact. For example, for contact 1320A, the global synchronization system has determined that Mr. Pike is currently in a time zone that is 12 hours different than the current time zone of the user and, thus, indicates that the current time zone for Mr. Pike is 8:44 AM. In one embodiment, the global synchronization system receives periodic GPS updates from contacts (and/or other geolocation information, such as determined based on cell tower or WiFi connections) and, stores those locations so that when requested by the user (e.g., in response to pulling up the partial contact list illustrated in FIG. 13), the locations for multiple contacts may be quickly accessible. In some embodiments, locations of contacts are requested and received in response to a user viewing contact information for such contacts. Thus, in some embodiments the time for a particular contact may initially indicate a "loading" icon of various formats, to indicate that a current time for a particular contact is being requested/loaded. In one embodiment, if the location cannot be determined in a predetermined time. (e.g., five seconds) the global synchronization system may be pre-configured to provide a best guess as to the time zone in which the contact is currently located. For example, a last known location of the contact may be used in order to determine the best guess time zone in which that contact is currently located. Alternatively, a home location (e.g., registered device location) of the contact may be used to determine the current time zone of the contact.

Moving to contact 1320B, contact information for Harry Smith is illustrated. In this example, the global synchronization system has determined that Harry lives in Mumbai India and, thus, provides a current time associated with Harry of 7:14 AM. Use of Harry's residence time zone may be in response to determining that Harry's mobile device is actually within that time zone or may be in response to not having better information to indicate Harry's location.

In one embodiment, various social media and other online services may be accessed in order to determine a location of a contact. For example, Harry's Facebook page may be accessed in order to identify any location indicators, such as by looking at geolocation information on photographs uploaded to Facebook by Harry, parsing messages uploaded by Harry to determine his location, and/or analyzing any other information on such social media sites to determine a current location. Similarly, Harry may have authorized other services to view certain information regarding his locale, such as allowing the global synchronization system to view basic Skype information that would indicate locations from which Harry has made calls in the recent past. Depending on the embodiment, the global synchronization system may use varying complexities of algorithms to determine the expected location of each contact.

In one embodiment, the global synchronization system may provide various warnings and/or indicators of local contact times that may not be appropriate for contact at the time the information is provided (e.g., at the time the contact information of FIG. 13 is provided). For example, in one embodiment those contacts that are currently located such that their respective local times are within an unacceptable call time period (e.g., late at night, early in morning, during national holiday, etc.) may be displayed in a different color or other visual indicator within the user interface. For example, such contacts may be displayed with a red background, while the contacts that are located within a time zone where current time is within an acceptable call time period (e.g., regular working hours), may show up with a green background, and contacts that are located within a time zone between the unacceptable and acceptable time periods (if one exists in a particular embodiment with more than two time periods), may be displayed in a yellow background. Such time periods may be determined by the individual user, the respective contacts, or defaults determined by the global synchronization system.

In one embodiment, an alert may be provided to the user if a call (or other contact) is initiated to a contact that is currently located within a time zone where local time is in an unacceptable call time period. For example, if the user of the computer device illustrated in FIG. 13, attempts to call Harnick Brown (contact 1320D), the user interface may provide a pop-up window that reminds the user that local time where Harnick is believed to be (e.g., based on device location of Harnick's cell phone) is 3:44 AM. The pop-up window may include details about Harnick's believed location, such as when the last location information was received from Harnick's cell phone, information regarding Harnick's travel plans from one or more social media sites, and/or any other information that may help the user assess whether or not the provided time of 3:44 AM is accurate. In some embodiments, the calling software may be configured to block calls to individuals that are believed to be in a time zone where local time is in an unacceptable call time period. For example, the user may be blocked from calling Harnick Brown because she is believed to be in a time zone where it is currently 3:44 AM.

In some embodiments, the global synchronization system may provide further details regarding a current location/time of a contact, such as information regarding one or more events or customs of the current location. For example, if contact 1320F is determined to be traveling in San Francisco, information regarding events, weather, political activities, etc., that are currently occurring in San Francisco may be provided to the user, either in the contact user interface itself (e.g. FIG. 13), or possibly in one or more pop-up or additional user interfaces.

Location specific information may be accessed from various sources, such as news feeds, social media feeds, and/or other data repositories. In one embodiment, the CIA Factbook may be accessed in order to pull information regarding a country, it's people, customs, holidays, etc., wherein a contact is determined to be located. Such information may be provided in a pop-up associated with the contact, a separate page, and/or in other manners. In one embodiment, if a user is about to make a call to a person (e.g., is viewing the contact's information, such as in the UI of FIG. 13 or 14), an initial pop-up with locale information for the contact's current location (e.g., "It's the NYC Marathon Today," "Banks Closed," etc.) may be provided. In one embodiment, the user may set a preference to provide various other types of additional information, or press a button to request such additional information (e.g., based on preset preferences of the user), such as call etiquette, facts about the country, etc. In one embodiment, interesting facts about a locale where a contact is located may be provided, such as information on historical/tourist sites, or local area traditions or superstitions (e.g., the Chinese are very mysterious about numbers and believe the number 8 is very lucky). Such information may be useful to the user in making small talk about the contact's locale and possibly strengthening the relationship between the user and the contact.

As noted above, in some embodiments the various contacts 1320A-1320G individually provide authorization for the global synchronization system (whether through a central server or directly to the user device 1310) to access geolocation data from one or more devices of the contact. For example, an application on the contacts mobile phone may be configured to provide invitations/authorizations for other users to access the current location of the mobile phone. In the example, of FIG. 13, Harnick (contact 1320D) has not authorized sharing of geolocation information with the global synchronization system (or at least not with the particular user accessing the user interface of FIG. 13) and, thus, her contact information includes an indication (a home icon in this example) that the time provided is her registered device location (which in most cases is the residence address of the individual). In contrast, contacts 1320E and 1320F have both authorized sharing of location information of one or more devices and, thus, a map pushpin icon (or any other icon or indication in other embodiments) is included in their contact information to indicate that the provided time is indicative of the current location of those contacts. In one embodiment, both a current location (e.g., based on device geolocation) and a registered location for a contact may be displayed in the user interface.

Figure 14:
FIG. 14 illustrates one possible detailed contact user interface, which may be provided in response to a user selecting a particular contact in the user interface of FIG. 13 (or and one of many other ways in other embodiments).

FIG. 14 illustrates one possible detailed contact user interface, which may be provided in response to a user selecting a particular contact in the user interface of FIG. 13 (or and one of many other ways in other embodiments). In this embodiment, contact 1320G of FIG. 13, associated with Helen Walters, has been selected in order to display the contact details 1400. In the example contact details 1400, information regarding Helen's current time zone is again provided, as well as information regarding a holiday that is observed at her current location and, the fact that businesses are typically closed during that holiday. Having been provided with such holiday information (and/or other local area information), the user may make a different choice regarding contacting Helen, such as to delay contact the Helen until the holiday is over and/or to contact her via a different medium, such as via email or text message, rather than calling.

Moving to FIG. 15, an example of the global synchronization systems implementation into a CRM system is provided. In this example, contact information, and other information, for a business, HAN International, is provided. In particular, the information for the chairman and CEO of the company is provided. Similar to the embodiments discussed above, a current time 1520 for Mr. Harry Park is illustrated, which may have been provided by geolocation information from one or more devices of Mr. Park, social media information associated with Mr. Park, etc. In this example, a current time 1510 at Mr. Park's home location is also provided. Thus, the user can quickly see that at Harry's home location the time is currently 9:44 PM, while the current time where Harry is currently located (or predicted to be located based on various input information) is 10:44 AM. Similar to the example above with reference to the contact information on the mobile device (FIGS. 13-14), the global synchronization system may provide various warnings, restrictions, and/or other information associated with the determined local time for a contact in a CRM system. For example, various data sources (e.g., such as those discussed above) may be accessed to aid the user in determining whether to make a call and/or to provide talking points to the user if the decision is made to make the call by supplying the user with locale information associated with the contact. For example, such information may indicate, for a contact located in Turkey, that it's a bank holiday in Turkey and businesses are closed. Other local specific information (It's impossible for anyone to keep up with what's happening in Seoul, Minsk, Beirut, etc.) may be provided about contacts in other locations.

As mentioned above, the global synchronization system features discussed herein may be implemented in various manners. For example, the features of the global synchronization system may be performed by various devices, such as by a mobile application executing on a mobile device, by a network accessible device, such as a server that communicates with various individuals in order to determine updated location information for those individuals, and/or some combination of software installed on user devices and one or more server applications. Thus, as used herein, global synchronization system refers to any such installation of software on one or more mobile, desktop, server, cloud, and/or other device.

Other Embodiments

A number of computing systems have been described throughout this disclosure. The descriptions of these systems are not intended to limit the teachings or applicability of this disclosure. For example, the systems described herein (e.g., the participant devices, the intelligent assistant hub, data sources, etc.) can generally include any computing device(s), such as servers, desktops, laptops, video game platforms, television set-top boxes, televisions (e.g., internet TVs), computerized appliances, and wireless mobile devices (e.g. smart phones, PDAs, tablets, or the like), to name a few. Further, it is possible for the systems described herein to be different types of devices, to include different applications, or to otherwise be configured differently. In addition, the systems described herein can include any type of operating system ("OS"). For example, the mobile computing systems described herein can implement an Android™ OS, a Windows® OS, a Mac® OS, a Linux or Unix-based OS, or the like.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be communicate via a variety of methods, including electronic communications such as: computer networking on a local area network or a wide area network, a POTS network, a cellular network, or any wireless-based and wired/cable-based mediums that may include analog communications or digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the systems and methods. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A computing system comprising:
   one or more processors;
      a memory storing instructions that, in response to execution by the one or more processors, causes the computing system to:
         receive, from a user of the computing system, a request for location information for each of a plurality of contacts;
         determine location information for respective contacts from the Internet and/or network activity of one or more of the respective contacts, wherein the Internet activity comprises one or more posts to social media data sources, and images and/or video associated with the one or more posts is analyzed using facial recognition technology to determine the location information for one or more of the respective contacts;
         determine a local time for the respective contacts based on the location information; and
         provide visual indications of the determined local times for the respective contacts to the user, the computing system configured to display the determined local times in association with the respective contacts.

2. The computing system of claim 1, wherein the instructions are further configured to cause the computing system to:
   determine one or more events associated with the respective contacts; and
   provide indications to the user of the determined one or more events.

3. The computing system of claim 1, wherein the instructions are further configured to cause the computing system to:
   determine, for respective contacts, holiday context information based on the location information for the respective contacts.

4. The computing system of claim 3, wherein the holiday context information is configured for display to the user in a pop-up that is activated in response to the user selecting a particular contact.

5. The computing system of claim 1, wherein the instructions are further configured to cause the computing system to:
   for each of the respective contacts, determine an unacceptable call time period.

6. The computing system of claim 5, wherein the instructions are further configured to cause the computing system to:
   in response to the user requesting to call a particular contact, wherein the local time of the particular contact is within the unacceptable call time period, provide a visual alert.

7. The computing system of claim 5, wherein the instructions are further configured to cause the computing system to:
   in response to the user requesting to call a particular contact, wherein the local time of the part contact is within the unacceptable call time period, provide an audible alert.

8. The computing system of claim 5, wherein if the determined local time for a particular contact is in the unacceptable call time period, provide the local time for the particular contact in a first text color different from a second text color for contacts within an acceptable call time period.

9. The computing system of claim 5, wherein if the determined local time for a particular contact is in the unacceptable call time period, provide the local time for the particular contact in a first text size different from a second text size for contacts within an acceptable call time period.

10. The computing system of claim 5, wherein if the determined local time for a particular contact is in the unacceptable call time period, provide the local time for the particular contact in a first text shading different from a second text shading for contacts within an acceptable call time period.

11. The computing system of claim 5, wherein the unacceptable call time period is determined based on the preferences of the respective contact.

12. A computing system comprising:
    one or more processors;
    a memory storing instructions that, in response to execution by the one or more processors, causes the computing system to:
       receive, from a user of the computing system, a request for location information for each of a plurality of contacts;
       determine location information for respective contacts from the Internet and/or network activity of one or more of the respective contacts, wherein the Internet activity comprises one or more posts to social media data sources, and audio data in the one or more posts is analyzed using voice recognition technology to determine location information for one or more of the respective contacts;
       determine a local time for the respective contacts based on the location information; and
       provide visual indications of the determined local times for the respective contacts to the user, the computing system configured to display the determined local times in association with the respective contacts.

13. The computing system of claim 12, wherein the location information is further determined from a geolocation based on data obtained from one or more of the social media data sources.

14. The computing system of claim 12, wherein the location information is further determined by analyzing metadata associated with the audio data.

15. A computing system comprising:
    one or more processors;
    a memory storing instructions that, in response to execution by the one or more processors, causes the computing system to:
       receive, from a user of the computing system, a request for location information for each of a plurality of contacts stored in a contact data structure on the computing device;
       determine location information for respective contacts from the Internet and/or network activity of one or more of the respective contacts, wherein the Internet activity comprises one or more posts to social media data sources, and images and/or video associated with the one or more posts is analyzed using facial recognition technology to determine the location information for one or more of the respective contacts;
       determine a local time for the respective contacts based on a current time zone and/or time associated with the location information; and
       provide visual indications of the determined local times for the respective contacts to the user, the computing system configured to display the determined local times in association with the respective contacts.

16. The computing system of claim 15, wherein the Internet activity comprises email.

17. The computer system of claim 15, wherein the location information is further determined by identifying objects and/or places in one or more of the images and/or video.

18. The computing system of claim 15, wherein text associated with the one or more posts is analyzed to determine location information for one or more of the respective contacts.

19. The computing system of claim 15, wherein the location information is further determined by analyzing metadata associated with images posted to one or more of the social media data sources.

20. The computing system of claim 15, wherein the location information is further determined from a geolocation based on data obtained from one or more of the social media data sources.

* * * * *